United States Patent
Shah et al.

(10) Patent No.: US 12,384,861 B2
(45) Date of Patent: Aug. 12, 2025

(54) CROSSLINKED COMPOSITIONS FROM OLEFIN/SILANE INTERPOLYMERS

(71) Applicant: Dow Global Technologies LLC, Midland, MI (US)

(72) Inventors: Andrew B. Shah, Collegeville, PA (US); Jordan C. Reddel, Midland, MI (US); Zachary S. Kean, Bay City, MI (US); Bethany M. Neilson, Manvel, TX (US); Gerald F. Billovits, Midland, MI (US); David D. Devore, Midland, MI (US); Mark F. Sonnenschein, Midland, MI (US); David S. Laitar, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 78 days.

(21) Appl. No.: 18/013,225

(22) PCT Filed: Jun. 23, 2021

(86) PCT No.: PCT/US2021/038560
§ 371 (c)(1),
(2) Date: Dec. 27, 2022

(87) PCT Pub. No.: WO2021/262775
PCT Pub. Date: Dec. 30, 2021

(65) Prior Publication Data
US 2023/0242693 A1 Aug. 3, 2023

Related U.S. Application Data

(60) Provisional application No. 63/043,193, filed on Jun. 24, 2020.

(51) Int. Cl.
*C08F 210/02* (2006.01)
*C08F 2/44* (2006.01)
(Continued)

(52) U.S. Cl.
CPC .............. *C08F 210/02* (2013.01); *C08F 2/44* (2013.01); *C08F 4/659* (2013.01);
(Continued)

(58) Field of Classification Search
CPC . C08F 210/02; C08F 230/085; C08L 2312/08
See application file for complete search history.

(56) References Cited

U.S. PATENT DOCUMENTS 5,672,660 A 9/1997 Medsker et al.
5,911,940 A 6/1999 Walton et al.
(Continued)

FOREIGN PATENT DOCUMENTS

EP 0852596 B1 * 6/2000 ................ C08J 3/24
JP 09137002 5/1997
(Continued)

OTHER PUBLICATIONS

SI-Link DFDA-5451 NT, Crosslinkable Polyethylene for Moisture Curable Power Cable Insulation, 2015, p. 1-3.
(Continued)

*Primary Examiner* — Catherine S Branch
(74) *Attorney, Agent, or Firm* — Karen L. Beckman

(57) ABSTRACT

A process to form a crosslinked composition, said process comprising thermally treating a composition that comprises the following components: a) an olefin/silane interpolymer, b) a cure catalyst, and c) a multi-vinyl compound. A composition comprising the following components: a) an olefin/silane interpolymer, b) a cure catalyst, and c) a multi-vinyl compound.

13 Claims, 6 Drawing Sheets

(51) Int. Cl.
*C08F 4/659* (2006.01)
*C08F 230/08* (2006.01)
*C08L 23/04* (2006.01)

(52) U.S. Cl.
CPC .......... *C08F 230/085* (2020.02); *C08L 23/04* (2013.01); *C08L 2312/08* (2013.01)

(56) References Cited

U.S. PATENT DOCUMENTS

| | | |
|---|---|---|
| 6,258,902 B1 | 7/2001 | Campbell, Jr. et al. |
| 6,476,132 B1 | 11/2002 | Abdou-Sabet et al. |
| 6,624,254 B1 | 9/2003 | Arriola et al. |
| 8,865,800 B2 | 10/2014 | Stammer et al. |
| 2017/0145131 A1 | 5/2017 | Ranganathan et al. |
| 2018/0223025 A1 | 8/2018 | Krishnamachari et al. |

FOREIGN PATENT DOCUMENTS

| | | |
|---|---|---|
| WO | 2018114633 | 6/2018 |
| WO | 2021038561 | 3/2021 |
| WO | 2021258328 | 12/2021 |
| WO | 2021262492 | 12/2021 |
| WO | 2021262774 | 12/2021 |
| WO | 2021262776 | 12/2021 |

OTHER PUBLICATIONS

PCT/US2021/038560, International Search Report and Written Opinion with a mailing date of Oct. 11, 2021.

\* cited by examiner

CROSSLINKED COMPOSITIONS FROM OLEFIN/SILANE INTERPOLYMERS

CROSS-REFERENCE TO RELATED APPLICATIONS

The present application claims the benefit of priority to U.S. Provisional Application No. 63/043,193, filed on Jun. 24, 2020, which is incorporated herein by reference in its entirety.

BACKGROUND OF THE INVENTION

Olefin-based polymers and polymer blends have been crosslinked using a hydrosilylation crosslinking agent and a crosslinking catalyst, such as a Pt catalyst (see U.S. Pat. Nos. 5,672,660, 6,476,132, 8,865,800, US 2017/0145131 and JP9137002A). Olefins-based polymers containing reactive dimethyl, hydrosilyl groups, for example —$Si(CH_3)_2H$, can be prepared by copolymerizing ethylene and/or other alpha-olefins, with monomers, such as an octenylsilane, a hexenylsilane and an allylsilane (see U.S. Pat. Nos. 6,624,254; 6,258,902). Such interpolymers may be further functionalized and/or crosslinked.

It has been discovered that olefin-based interpolymers containing, for example, —$Si(CH_3)_2H$ functionality can be crosslinked using a multi-vinyl compound, via a hydrosilylation reaction with a catalyst, such as a "Pt containing" catalyst. These crosslinking formulations can be prepared by co-dissolution of the polymer and components in a common solvent, followed by removal of the solvent; or by melt blending the components through the addition of thermal energy, followed by mixing to homogenize and evenly disperse the curing components. It has been discovered that upon heating the formulated polymer above its melting point, the reaction of the multi-vinyl compound with silane groups, for example —$Si(CH_3)_2H$, in the presence of the catalyst, results in the formation of covalently bonded crosslinks between, for example, adjacent interpolymer chains. See, for example, FIG. 1.

SUMMARY OF THE INVENTION

A process to form a crosslinked composition, said process comprising thermally treating a composition that comprises of the following components:
a) an olefin/silane interpolymer,
b) a cure catalyst, and
c) a multi-vinyl compound.

A composition comprising the following components:
a) an olefin/silane interpolymer,
b) a cure catalyst, and
c) a multi-vinyl compound.

DETAILED DESCRIPTION OF THE INVENTION

Figure 1:
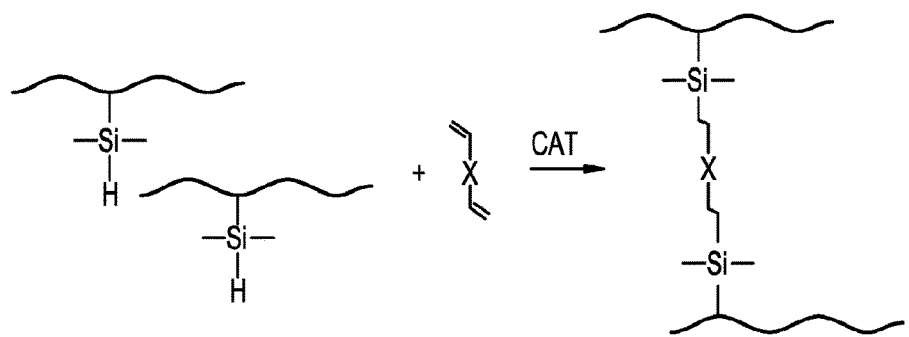
FIG. 1 is a schematic of the hydrosilylation of an olefin/silane interpolymer in the presence of a cure catalyst.

As discussed above, in a first aspect of the invention, a process is provided, to form a crosslinked composition, the process comprising thermally treating a composition that comprises the following components:
a) an olefin/silane interpolymer,
b) a cure catalyst, and
c) a multi-vinyl compound.

The above process may comprise a combination of two or more embodiments, as described herein. Each component a, b and c may comprise a combination of two or more embodiments, as described herein.

Also provided, in a second aspect of the invention, is a composition comprising the following components:
a) an olefin/silane interpolymer,
b) a cure catalyst, and
c) a multi-vinyl compound.

The above composition may comprise a combination of two or more embodiments, as described herein. Each component a, b and c may comprise a combination of two or more embodiments, as described herein.

The following embodiments apply to both the first aspect and the second aspect of the invention, unless stated otherwise.

In one embodiment, or a combination of two or more embodiments, each described herein, the olefin/silane interpolymer of component a is an ethylene/alpha-olefin/silane interpolymer, and further an ethylene/alpha-olefin/silane terpolymer.

In one embodiment, or a combination of two or more embodiments, each described herein, the silane of the olefin/silane interpolymer is derived from a compound selected from the following: $H_2C=CH-R_1-Si(R)(R')-H$, where R1 is an alkylene, and R and R' are each independently an alkyl, and R and R' may be the same or different.

In one embodiment, or a combination of two or more embodiments, each described herein, the silane of the olefin/silane interpolymer is derived from a compound selected from the following:

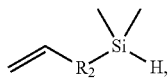

where $R_2$ is an alkylene.

In one embodiment, or a combination of two or more embodiments, each described herein, the silane of the olefin/silane interpolymer is derived from a compound selected from the following:

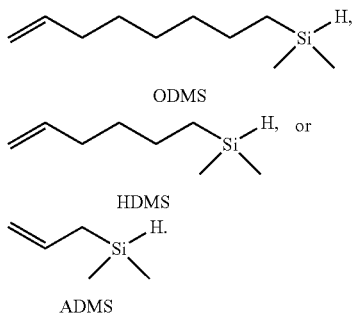

ODMS

HDMS

ADMS

In one embodiment, or a combination of two or more embodiments, each described herein, the cure catalyst of component b comprises platinum(0)-1,3-divinyl-1,1,3,3-tetramethyldisiloxane.

In one embodiment, or a combination of two or more embodiments, each described herein, the multi-vinyl compound of component c is selected from the following i)-iv):

i)

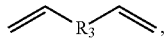

where R3 is selected from an alkylene or an arylene;

ii) a polydiene comprising at least one of the following structure:—$(CR1R2-CR3=CR4-CR5R6)_n$—$(CR7R8-CR9(CR10=CR11R12))_m$—, where each of R1 through R12 is, independently, hydrogen (H) or an alkyl, and n≥1 and m≥1, and further each of R1 through R12 is hydrogen, and further n is from 1 to 50, or from 1 to 40, or from 1 to 30, or from 1 to 20, and m is from 1 to 50, or from 1 to 40, or from 1 to 30, or from 1 to 20;

iii) $H_3C-CH_2-C[R4-O-C(O)-CH=CH_2]_3$, where R4 is an alkylene or an arylene; or iv) a cyclic siloxane of the following structure —$[Si(CH=CH_2)(R5)-O]_n$—, where R5 is an alkyl, and n is from 3 to 6.

In one embodiment, or a combination of two or more embodiments, each described herein, the multi-vinyl compound of component c is selected from the following: dodecadiene, divinylbenzene, tetravinyltetramethylcyclotetrasiloxane (ViD4), trimethylolpropane triacrylate (TMPTA), or a polybutadiene comprising≥80 mol %,≥85 mol %, or ≥90 mol % of 1,2 vinyl groups, based on the total vinyl content, and having a melt viscosity, at 45° C., from 30 to 500 cP, or from 30 to 400 cP, or from 30 to 300 cP, or from 30 to 200 cP, or from 30 to 150 cP, or from 30 to 100 cP.

In one embodiment, or a combination of two or more embodiments, each described herein, the composition further comprises component d: a cure inhibitor. In one embodiment, or a combination of two or more embodiments, each described herein, the cure inhibitor is selected from the following:

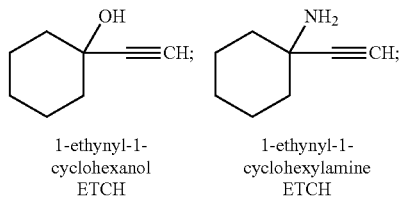

1-ethynyl-1-cyclohexanol
ETCH 1-ethynyl-1-cyclohexylamine
ETCH

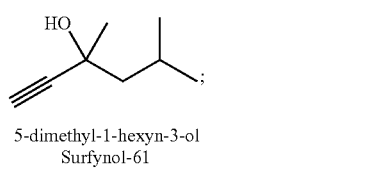

5-dimethyl-1-hexyn-3-ol
Surfynol-61

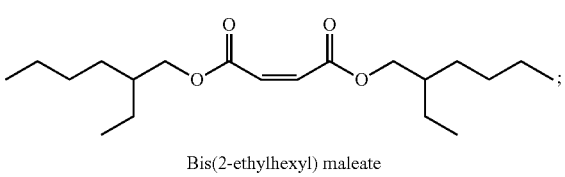

Bis(2-ethylhexyl) maleate

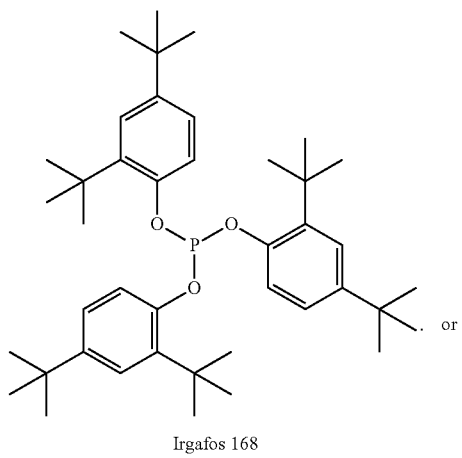

Irgafos 168

. or

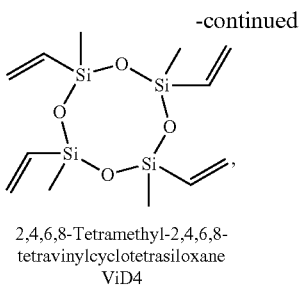

2,4,6,8-Tetramethyl-2,4,6,8-
tetravinylcyclotetrasiloxane
ViD4 not used as component c.

Note, when ViD4 is used as a cure inhibitor (component d), it is typically present in an amount from 0.01 to 0.10 wt %, based on the weight of the composition. When ViD4 is used as a multi-vinyl compound (component c), it is typically present in an amount from 1.0 to 5.0 wt %, based on the weight of the composition In one embodiment, or a combination of two or more embodiments, each described herein, the composition further comprises component e, selected from the following: IRGANOX 1010, IRGANOX 1076, or a combination thereof.

In one embodiment, or a combination of two or more embodiments, each described herein, the composition is thermally treated at a temperature ≥40° C., or ≥45° C., or ≥50° C., or ≥55° C., or ≥60° C., or ≥65° C., or ≥70° C. In one embodiment, or a combination of two or more embodiments, each described herein, the composition is thermally treated at a temperature ≤200° C., or ≤180° C., or ≤160° C., or ≤140° C., or ≤120° C., or ≤100° C.

In one embodiment, or a combination of two or more embodiments, each described herein, the process further comprises, before thermal treatment of the composition comprising components a-c, adding component c to component a, before, or simultaneously with, the addition of component b to component a.

In one embodiment, or a combination of two or more embodiments, each described herein, the composition further comprises a filler, and further the filler is present in an amount from 1.0 wt %, or 2.0 wt %, or 5.0 wt % to 10 wt %, or 15 wt %, or 20 wt %, where each weight percent is based on the weight of the composition.

Also is provided a crosslinked composition formed by an inventive process as described herein, or from an inventive composition as described herein.

Also provided is an article comprising of at least one component formed from a composition of any one embodiment, or a combination of two or more embodiments, each described herein. In one embodiment, or a combination of two or more embodiments, each described herein, the article is a film. In one embodiment, or a combination of two or more embodiments, each described herein, the article is an automotive part, and a building material, or a computer part.

Silane Monomers

A silane monomer, as used herein, comprises at least one (type) Si—H group. In one embodiment, the silane monomer is selected from Formula 1:

A-(SiBC—O)$_x$—Si—EFH  (Formula 1), where A is an alkenyl group;

B is a hydrocarbyl group or hydrogen, C is a hydrocarbyl group or hydrogen, and where B and C may be the same or different;

H is hydrogen, and x≥0;

E is a hydrocarbyl group or hydrogen, F is a hydrocarbyl group or hydrogen, and where E and F may be the same or different.

Some examples of silane monomers include hexenylsilane, allylsilane, vinylsilane, octenylsilane, hexenyldimethylsilane, octenyldimethylsilane, vinyldimethylsilane, vinyldiethylsilane, vinyldi(n-butyl)silane, vinylmethyloctadecylsilane, vinyidiphenylsilane, vinyldibenzylsilane, allyldimethylsilane, allyldiethylsilane, allyldi(n-butyl)silane, allylmethyloctadecylsilane, allyldiphenylsilane, bishexenylsilane, and allyidibenzylsilane. Mixtures of the foregoing alkenylsilanes may also be used.

More specific examples of silane monomers include the following: (5-hexenyldimethylsilane (HDMS), 7-octenyldimethylsilane (ODMS), allyldimethylsilane (ADMS), 3-butenyldimethylsilane, 1-(but-3-en-1-yl)-1,1,3,3-tetramethyldisiloxane (BuMMH), 1-(hex-5-en-1-yl)-1,1,3,3-tetramethyldisiloxane (HexMMH), (2-bicyclo[2.2.1]hept-5-en-2-yl)ethyl)-dimethylsilane (NorDMS) and 1-(2-bicyclo[2.2.1]hept-5-en-2-yl)ethyl)-1,1,3,3-tetramethyldisiloxane (NorMMH).

Cure Catalysts

A cure catalyst, as used herein, is a compound that accelerates the reaction between pendant silane moieties, for example, —Si(CH$_3$)$_2$H, on the olefin/silane interpolymer chain and the vinyl groups of the multi-vinyl compound. Suitable catalysts include catalysts based on platinum, or other metals such as tin or nickel, Ir, or Rh. In one embodiment, or a combination of two or more embodiments, each described herein, the catalyst comprises Pt, Sn, Ni, Ir or Rh, further Pt, Sn or Ni, further Pt or Sn, further Pt. The best known among these catalysts is Karstedt's catalyst (that is, platinum(0)-1,3-divinyl-1,1,3,3-tetramethyldisiloxane complex solution), as shown by the following structure. Karstedt's catalyst is available commercially (Sigma Aldrich) as a solution in xylene containing 2 wt % Pt by weight.

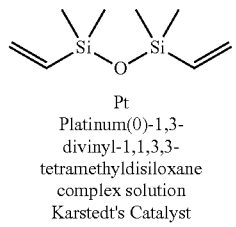

Pt
Platinum(0)-1,3-
divinyl-1,1,3,3-
tetramethyldisiloxane
complex solution
Karstedt's Catalyst Multi-Vinyl Compounds A multi-vinyl compound comprise two or more vinyl (—CH═CH$_2$) groups. Preferred multi-vinyl agents tend to be lower molecular compounds that exhibit sufficient solubility or thermodynamic miscibility with the olefin/silane interpolymer to allow homogeneous distribution of this component in the formulation, at the composition necessary to achieve the desired level of crosslinking. Suitable compounds include tetravinyltetramethylcyclotetrasiloxane (ViD4), low molecular weight polybutadiene with predominantly 1,2-addition (approximately 90 mol % 1,2-vinyl), dodecadiene, divinylbenzene, trimethylolpropane triacrylate (TMPTA), and the like.

Less preferred agents that may still offer some crosslinking activity tend to be higher molecular weight compounds that contain a low density of vinyl groups or have significant polarity or exhibit limited solubility in the formulated olefin/silane interpolymer. Some examples of these less suitable agents include ethylene-co-propylene-co-ethylidene norbornene (EPDM) copolymers and polybutadiene with a high percentage of 1,4 addition (containing 50 mol % or more internal cis or trans vinylene groups).

Cure Inhibitors

A cure inhibitor, as used herein, delays the hydrosilylation reaction with the multi-vinyl compound. Inhibitors can also be added to formulations to delay the onset of crosslinking through hydrosilylation. These inhibitors can temporarily complex with vinyl groups, for example, in the Pt catalyst complex, to prevent catalyst activity. It was discovered that different types of inhibitors and inhibitor loadings lead to different crosslinking rates, as a function of temperature. This finding allows for a high degree of tunability in designing polymer processability windows, when premature crosslinking of a melt-blended, catalyst-containing formulation is a concern.

Melt processable, crosslinkable formulations can be produced by introducing hydrosilylation inhibitors into the formulation containing, for example, an —Si(CH$_3$)$_2$H functionalized olefin/silane interpolymer, a multi-vinyl compound, and a Pt catalyst. These inhibitory compounds bind competitively with the Pt catalyst, delaying the hydrosilylation reaction with the multi-vinyl compound. As the temperature is increased, the inhibitors debond from the catalyst, enabling hydrosilylation-based crosslinking reactions. Suitable hydrosilylation inhibitors include dioctyl maleate, surfynol-61, ETCH, ETCHA, phosphitebased antioxidants such as IRGAFOS 168 (or IRGAFOS 1680), and tetravinyltetramethylcyclotetrasiloxane (ViD4).

Additives

An inventive composition may comprise one or more additives. Additives include, but are not limited to, UV stabilizer, antioxidants, fillers, scorch retardants and flame retardants, tackifiers, waxes, compatibilizers, adhesion promoters, processing aids, blocking agents, antiblocking agents, anti-static agents, release agents, anti-cling additives, colorants, dyes, pigments, and combination thereof.

In one embodiment, or a combination of two or more embodiments, each described herein, an inventive composition further comprises a thermoplastic polymer, different from the olefin/silane interpolymer (component a) in one or more features, such as monomer(s) types and/or amounts, Mn, Mw, Mz, MWD, VO.1, V100, RR (VO.1/V100), or any combination thereof; and further monomer(s) types and/or amounts, Mn, Mw, MWD, or any combination thereof. Polymers include, but not limited to, ethylene-based polymers, propylene-based polymers, and olefin multi-block interpolymers. Suitable ethylene-based polymers include, but are not limited to, linear low density polyethylene (LLDPE), very low density polyethylene (VLDPE), ultra-low density polyethylene (ULDPE), homogeneously branched linear ethylene-based polymers, and homogeneously branched substantially linear ethylene-based polymers (that is homogeneously branched, long chain branched ethylene polymers). Examples of propylene-based polymers include polypropylene homopolymers and propylene/ethylene copolymers.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus includes the term homopolymer (employed to refer to polymers prepared from only one type of monomer, with the understanding that trace amounts of impurities can be incorporated into the polymer structure), and the term interpolymer as defined hereinafter.

Trace amounts of impurities, such as catalyst residues, can be incorporated into and/or within the polymer. Typically, a polymer is stabilized with very low amounts ("ppm" amounts) of one or more stabilizers.

The term "interpolymer," as used herein, refers to polymer prepared by the polymerization of at least two different types of monomers. The term interpolymer thus includes the term copolymer (employed to refer to polymers prepared from two different types of monomers) and polymers prepared from more than two different types of monomers.

The term "olefin-based polymer," as used herein, refers to a polymer that comprises, in polymerized form, 50 wt % or a majority weight percent of an olefin, such as ethylene or propylene (based on the weight of the polymer), and optionally may comprise one or more comonomers.

The term "propylene-based polymer," as used herein, refers to a polymer that comprises, in polymerized form, a majority weight percent of propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "ethylene/alpha-olefin interpolymer," as used herein, refers to a random interpolymer that comprises, in polymerized form, 50 wt % or a majority weight percent of ethylene (based on the weight of the interpolymer), and an alpha-olefin.

The term, "ethylene/alpha-olefin copolymer," as used herein, refers to a random copolymer that comprises, in polymerized form, 50 wt % or a majority amount of ethylene monomer (based on the weight of the copolymer), and an alpha-olefin, as the only two monomer types.

The term "olefin/silane interpolymer," as used herein, refers to a random interpolymer that comprises, in polymerized form, 50 wt % or a majority weight percent of an olefin (based on the weight of the interpolymer), and a silane monomer. As used herein, the interpolymer comprises at least one Si—H group, and the phrase "at least one Si—H group" refers to a type of "Si—H" group. It is understood in the art that the interpolymer would contain a multiple number of this Si—H type. The olefin/silane interpolymer is formed by the copolymerization of at least the olefin and the silane monomer. An example of a silane monomer is shown in Formula 1, described herein.

The term "ethylene/silane interpolymer," as used herein, refers to a random interpolymer that comprises, in polymerized form, 50 wt % or a majority weight percent of ethylene (based on the weight of the interpolymer), and a silane monomer. As used herein, the interpolymer comprises at least one Si—H group, as discussed above. The ethylene/silane interpolymer is formed by the copolymerization of at least the ethylene and the silane monomer.

The term "ethylene/alpha-olefin/silane interpolymer," as used herein, refers to a random interpolymer that comprises, in polymerized form, 50 wt % or a majority weight percent of ethylene (based on the weight of the interpolymer), an alpha-olefin and a silane monomer. As used herein, the interpolymer comprises at least one Si—H group, as discussed above. The ethylene/silane interpolymer is formed by the copolymerization of at least the ethylene, the alpha-olefin and the silane monomer.

The term "ethylene/alpha-olefin/silane terpolymer," as used herein, refers to a random terpolymer that comprises, in polymerized form, 50 wt % or a majority weight percent of ethylene (based on the weight of the terpolymer), an alpha-olefin and a silane monomer as the only three monomer types. As used herein, the terpolymer comprises at least one Si—H group, as discussed above. The ethylene/silane terpolymer is formed by the copolymerization of the ethylene, the alpha-olefin and the silane monomer.

The terms "hydrocarbon group," "hydrocarbyl group," and similar terms, as used herein, refer to a chemical group containing only carbon and hydrogen atoms.

The term "crosslinked composition," as used herein, refers to a composition that has a network structure due to the formation of chemical bonds between polymer chains. The formation of this network structure can be indicated by the increase in the complex viscosity or shear storage modulus as discussed herein.

The term "crosslinked olefin/silane interpolymer," as used herein, refers to an olefin/silane interpolymer that has a network structure due to the formation of chemical bonds between polymer chains. The formation of this network structure can be indicated by the increase in the complex viscosity or shear storage modulus as discussed herein.

The terms "thermally treating," "thermal treatment," and similar terms, as used herein, in reference to a composition comprising an olefin/silane interpolymer, refer to the application of heat to the composition. Heat may be applied by conduction (for example, a heating coil), by convection (for example, heat transfer through a fluid, such as water or air), and/or by radiation (for example, heat transfer using electromagnetic waves). Preferably heat is applied by conduction or convection. Note, the temperature at which the thermal treatment takes place, refers to the temperature of the composition (for example, the melt temperature of the composition).

The term "alkenyl group," as used herein, refers to an organic chemical group that contains at least one carbon-carbon double bond (C═C). In a preferred embodiment, the alkenyl group is a hydrocarbon group containing at least one carbon-carbon double bond, and further containing only one carbon-carbon double bond.

As used herein, R1=$R_1$, R2=$R_2$, R3=$R_3$, and so forth. In each of linkages (L1-L5), as described herein, the wavy line "⁓" denotes an attachment (bond) between the respective linkage and the remainder of an olefin/silane interpolymer.

The terms "comprising," "including," "having," and their derivatives, are not intended to exclude the presence of any additional component, step or procedure, whether the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure, not specifically delineated or listed.

The phrase "a majority weight percent," as used herein, in reference to a polymer (or interpolymer or terpolymer or copolymer), refers to the amount of monomer present in the greatest amount in the polymer.

Listing of Some Process and Composition Features

A] A process to form a crosslinked composition, said process comprising thermally treating a composition that comprises the following components:
  a) an olefin/silane interpolymer,
  b) a cure catalyst, and
  c) a multi-vinyl compound.

B] The process of A] above, wherein the olefin/silane interpolymer (component a) is an ethylene/alpha-olefin/silane interpolymer, and further an ethylene/alpha-olefin/silane terpolymer.

C] The process of B] above, wherein the alpha-olefin of the ethylene/alpha-olefin/silane interpolymer is a C3-C20 alpha-olefin, and further a C3-C10 alpha-olefin, and further propylene, 1-butene, 1-hexene, 1-octene and 1-decene, and further propylene, 1-butene, 1-hexene or 1-octene, and further propylene, 1-butene, or 1-octene, and further 1-butene or 1-octene, further 1-octene.

D] The process of any one of A]-C] (A] through C]) above, wherein the silane of the olefin/silane interpolymer is derived from a compound selected from the following: $H_2C$═$CH$—$R_1$—$Si(R)(R')$—H, where $R_1$ is an alkylene, and R and R' are each independently an alkyl, and R and R' may be the same or different.

E] the process of any one of A]-D] above, wherein the silane of the olefin/silane interpolymer is derived from a compound selected from the following:

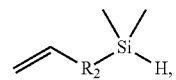

where $R_2$ is an alkylene.

F] the process of any one of A]-E] above, wherein the silane of the olefin/silane interpolymer is derived from a compound selected from the following:

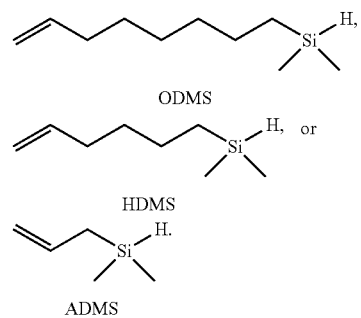

G] The process of any one of A]-F] above, wherein the cure catalyst (component b) comprises platinum (Pt), and further platinum(0)-1,3-divinyl-1,1,3,3-tetramethyldisiloxane.

H] The process of any one of A]-G] above, wherein the multi-vinyl compound of component c is selected from the following i)-iv):

i)

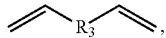

R3, where R3 is selected from an alkylene or an arylene;

ii) a polydiene comprising at least one of the following structure:—(CR1R2-CR3=CR4-CR5R6)$_n$—(CR7R8-CR9(CR10=CR11R12))$_m$—, where each of R1 through R12 is, independently, hydrogen (H) or an alkyl, and n≥1 and m≥1, and further each of R1 through R12 is hydrogen, and further n is from 1 to 50, or from 1 to 40, or from 1 to 30, or from 1 to 20, and m is from 1 to 50, or from 1 to 40, or from 1 to 30, or from 1 to 20;

iii) H$_3$C—CH$_2$—C[R4—O—C(O)—CH=CH$_2$]$_3$, where R4 is an alkylene or an arylene; or iv) a cyclic siloxane of the following structure —[Si(CH=CH$_2$)(R5)-O]$_n$—, where R5 is an alkyl, and n is from 3 to 6.

I] The process of any one of A]—H] above, wherein the vinyl compound of component c is selected from the following: dodecadiene, divinylbenzene, tetravinyltetramethylcyclotetrasiloxane (ViD4), trimethylolpropane triacrylate (TMPTA), or a polybutadiene comprising ≥80 mol %, ≥85 mol %, or ≥90 mol % of 1,2 vinyl groups, based on the total vinyl content, and having a melt viscosity, at 45° C., from 30 to 500 cP, or from 30 to 400 cP, or from 30 to 300 cP, or from 30 to 200 cP, or from 30 to 150 cP, or from 30 to 100 cP.

J] The process of any one of A]-I] above, wherein the composition further comprises component d: a cure inhibitor.

K] The process of J] above, wherein the cure inhibitor of component d is selected from the following:

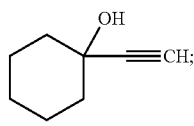

1-ethynyl-1-cyclohexanol
ETCH

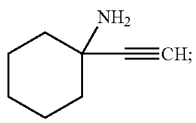

1-ethynyl-1-cyclohexylamine
ETCHA

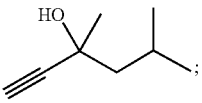

5-dimethyl-1hexyn-3-ol
Surfynol-61

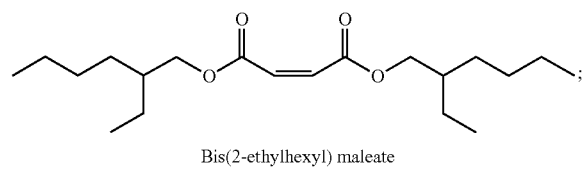

Bis(2-ethylhexyl) maleate

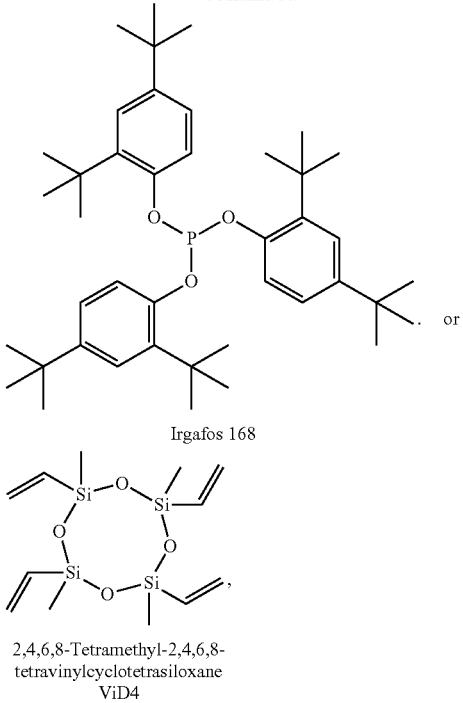

Irgafos 168

2,4,6,8-Tetramethyl-2,4,6,8-tetravinylcyclotetrasiloxane
ViD4 if ViD4 is not used as component c.

L] The process of J] or K] above, wherein the cure inhibitor of component d is

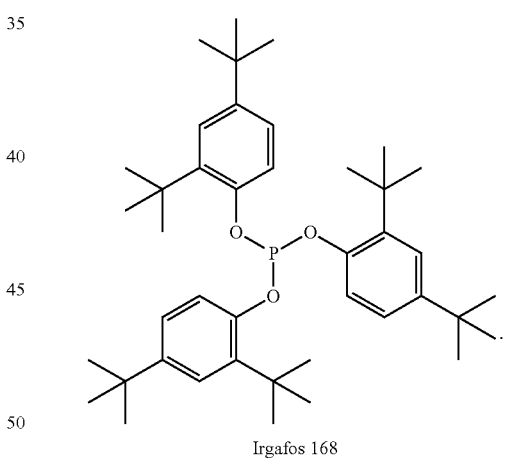

Irgafos 168

M] The process of any one of J]-L] above, wherein the cure inhibitor of component d is added in an amount required to increase the temperature, at which the onset of crosslinking occurs, as determined by DMA (see expt. section below), by ≥20° C., or ≥30° C., or ≥40° C., or ≥50° C., as compared to the same composition that does not contain the component d. Note, the temperature at the onset of crosslinking, as used herein, is the temperature (T) at which the complex viscosity value or the shear storage modulus value increases by ≥10%, relative to the respective value at "T-10° C."

N] The process of any one of A]-M] above, wherein the composition further comprises component e, selected from the following:

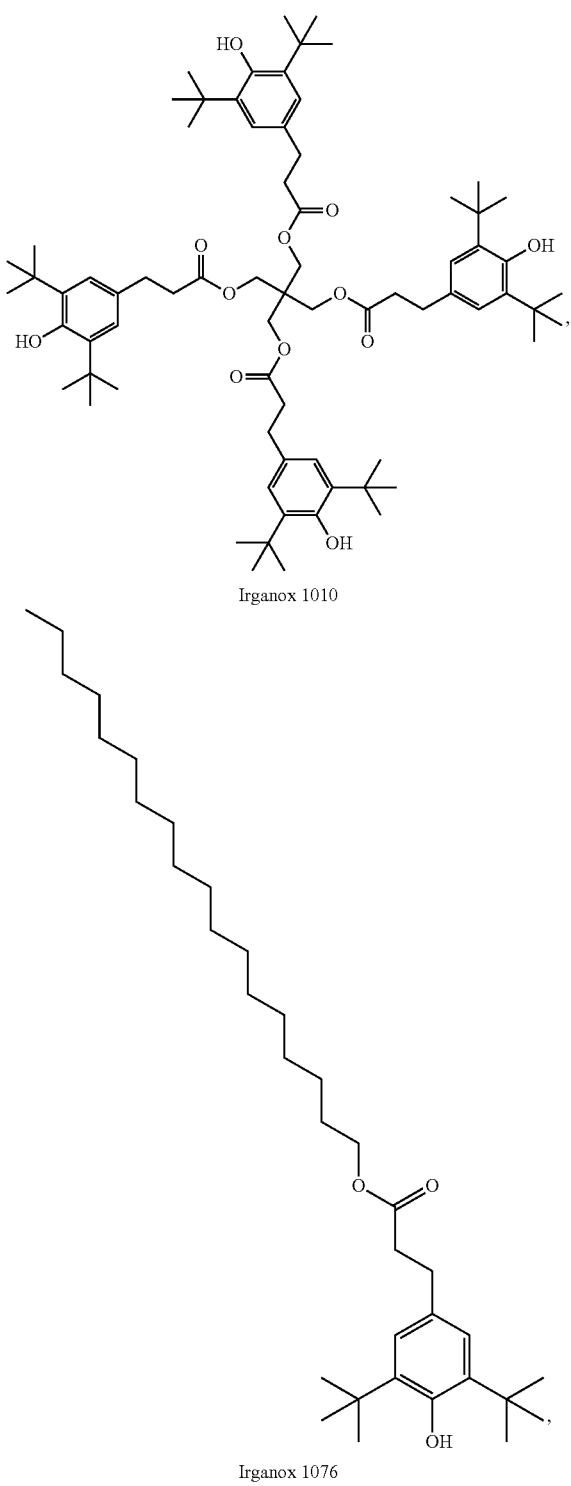

Irganox 1010

Irganox 1076 or a combination thereof.

O] The process of N] above, wherein component e is added in an amount required to decrease the temperature, at which the onset of crosslinking occurs, as determined by DMA (see below), by ≤10° C., or ≤15° C., or ≤20° C., as compared to the same composition that does not contain the component e.

P] The process of any one of A]—O] above, wherein the composition further comprises a filler, and further the filler is present in an amount from 1.0 wt %, or 2.0 wt %, or 5.0 wt % to 10 wt %, or 15 wt %, or 20 wt %. where each weight percent is based on the weight of the composition.

Q] The process of any one of A]-P] above, wherein the composition is thermally treated at a temperature ≥40° C., or ≥45° C., or ≥50° C., or ≥55° C., or ≥60° C., or ≥65° C., or ≥70° C.

R] The process of any one of A]-Q] above, wherein the composition is thermally treated at a temperature ≤200° C., or ≤180° C., or ≤160° C., or ≤140° C., or ≤120° C., or ≤100° C.

S] The process of any one of A]-R] above, further comprising, before thermal treatment of the composition comprising components a-c, adding component c to component a, before, or simultaneously with, the addition of component b to component a.

T] The process of S] above, further comprising adding component c to component a, before the addition of component b to component a.

U] The process of S] above, further comprising adding component c to component a, simultaneously with the addition of component b to component a.

V] The process of any one of A]-U] above, wherein component b is present in an amount from 5 to 200 ppm, or from 10 to 100 ppm, based on the weight of the composition.

W] The process of any one of A]-V] above, wherein the weight ratio of the cure catalyst (component b) to the multi-vinyl compound (component c) is ≥0.0005, or ≥0.0050, or ≥0.0100.

X] The process of any one of A]-W] above, wherein the weight ratio of the cure catalyst (component b) to the multi-vinyl compound (component c) is ≤10, or ≤8.0, or ≤6.0.

Y] The process of any one of A]-X] above, wherein the composition comprises ≥50.0 wt %, or ≥55.0 wt %, or ≥60.0 wt %, or ≥65.0 wt %, or ≥70.0 wt %, or ≥75.0 wt %, or ≥80.0 wt %, or ≥85.0 wt %, or ≥90.0 wt % of component a, based on the weight of the composition.

Z] The process of any one of A]-Y] above, wherein the composition comprises ≤99.9 wt %, or ≤99.5 wt %, or ≤99.0 wt %, or ≤98.5 wt %, or ≤98.0 wt % of component a, based on the weight of the composition.

A2] The process of any one of A]-Z] above, wherein the composition has a weight ratio of component a to component c ≥2.00, or ≥2.50, or ≥3.00, or ≥3.50, or ≥4.00.

B2] The process of any one of A]-A2] above, wherein the composition has a weight ratio of component a to component c≤100, or ≤95, or ≤90, or ≤85, or ≤80.

C2] The process of any one of A]-B2] above, wherein the composition comprises ≥0.20 wt %, or ≥0.30 wt %, or ≥0.40 wt %, or ≥0.50 wt %, or ≥0.60 wt %, or ≥0.70 wt %, or ≥0.80 wt %, or ≥0.90 wt %, or ≥1.00 wt % of component c, based on the weight of the composition.

D2] The process of any one of A]-C2] above, wherein the composition comprises ≤50.0 wt %, or ≤40.0 wt %, or ≤30.0 wt %, or ≤20.0 wt %, or ≤10.0 wt %, or ≤5.0 wt % of component c, based on the weight of the composition.

E2] The process of any one of A]-D2] above, wherein the composition comprises ≥0 wt %, or ≥0.005 wt %, or ≥0.01 wt %, or ≥0.02 wt %, or ≥0.04 wt %, or ≥0.06 wt %, or ≥0.08 wt % of component d, based on the weight of the composition.

F2] The process of any one of A]-E2] above, wherein the composition comprises ≤20.0 wt %, or ≤15.0 wt %, or ≤10.0 wt %, or ≤5.0 wt %, or ≤2.0 wt %, or ≤1.0 wt %, or ≤0.80 wt %, or ≤0.60 wt %, or ≤0.40 wt %, or ≤0.20 wt %, or ≤0.10 wt % of component d, based on the weight of the composition.

G2] The process of any one of A]-F2] above, wherein the composition further comprises a solvent (a substance (typically a liquid at ambient conditions) that dissolves at least components a through c).

H2] The process of any one of A]-G2] above, wherein the composition comprises ≤1.0 wt, or ≤0.5 wt %, or ≤0.05 wt %, or ≤0.01 wt % of a solvent, based on the weight of the composition.

I2] The process of any one of A]-F2] above, wherein the composition does not comprise a solvent.

J2] The process of any one of A]-I2] above, wherein the interpolymer of component a comprises, in polymerized form, from ≥0.20 wt %, or ≥0.40 wt %, or ≥0.60 wt %, or ≥0.80 wt %, or ≥1.00 wt %, or ≥1.20 wt % of the silane (monomer), based on the weight of the interpolymer.

K2] The process of any one of A]-J2] above, wherein the interpolymer of component a comprises, in polymerized form, from ≤10 wt %, or ≤5.0 wt %, or ≤4.0 wt %, or ≤3.8 wt %, or ≤3.6 wt %, or ≤3.4 wt %, or ≤3.2 wt %, or ≤3.0 wt %, of the silane (monomer), based on the weight of the interpolymer.

L2] The process of any one of A]-K2] above, wherein the interpolymer of component a comprises, in polymerized form, from ≥20 wt %, or ≥22 wt %, or ≥24 wt %, or ≥26 wt %, or ≥28 wt %, or ≥30 wt % of the alpha-olefin, based on the weight of the interpolymer.

M2] The process of any one of A]-L2] above, wherein the interpolymer of component a comprises, in polymerized form, from ≤60 wt %, or ≤58 wt %, or ≤56 wt %, or ≤54 wt %, or ≤52 wt %, or ≤50 wt % of the alpha-olefin, based on the weight of the interpolymer.

N2] The process of any one of A]-M2] above, wherein the interpolymer of component a has a molecular weight distribution (MWD=Mw/Mn) ≥1.6, or ≥1.8, or ≥1.9, or ≥2.0.

O2] The process of any one of A]-N2] above, wherein the interpolymer of component a has a molecular weight distribution MWD ≤3.0, or ≤2.9, or ≤2.8, or ≤2.7, or ≤2.6.

P2] The process of any one of A]-O2] above, wherein the interpolymer of component a has a number average molecular weight (Mn) ≥10,000 g/mol, or ≥12,000 g/mol, or ≥14,000 g/mol ≥16,000 g/mol.

Q2] The process of any one of A]-P2] above, wherein the interpolymer of component a has a number average molecular weight (Mn)≤100,000 g/mol, or ≤95,000 g/mol, or ≤90,000 g/mol, or ≤85,000 g/mol, or ≤80,000 g/mol, or ≤75,000 g/mol, or ≤70,000 g/mol.

R2] The process of any one of A]-Q2] above, wherein the interpolymer of component a has a weight average molecular weight (Mw) ≥30,000 g/mol, or ≥35,000 g/mol, or ≥40,000 g/mol, or ≥45,000 g/mol, or ≥50,000 g/mol, or ≥55,000 g/mol, or ≥60,000 g/mol.

S2] The process of any one of A]-R2] above, wherein the interpolymer of component a has a weight average molecular weight (Mw)≤200,000 g/mol, or ≤190,000 g/mol, or ≤180,000 g/mol, or ≤170,000 g/mol, or ≤160,000 g/mol, or ≤155,000 g/mol.

T2] The process of any one of A]-S2] above, wherein the interpolymer of component a has a melting temperature Tm ≥40° C., or ≥45° C., or ≥50° C., or ≥55° C., or ≥60° C.

U2] The process of any one of A]-T2] above, wherein the interpolymer of component a has a melting temperature Tm ≤120° C., or ≤115° C., or ≤110° C., or ≤105° C., or ≤100° C.

V2] The process of any one of A]-U2] above, wherein the interpolymer of component a has a % crystallinity ≥1.8%, or ≥2.0%, or ≥2.1%, or ≥2.2%, or ≥2.3%, or ≥2.4%.

W2] The process of any one of A]-V2] above, wherein the interpolymer of component a has a % crystallinity ≤22%, ≤20%, or ≤18%, or ≤16%, or ≤14%, or ≤13%, or ≤12%.

X2] A crosslinked composition formed from the process of any one of A]-W2] above.

Y2] The crosslinked composition of X2] above, wherein the crosslinked composition comprises a crosslinked olefin/silane interpolymer comprising a linkage selected from L1 to L5 below, as a crosslink between interpolymer molecules:

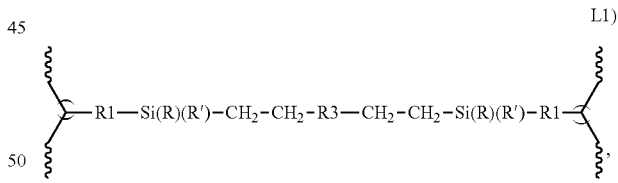
(L1)

where each R1 is an alkylene, R3 is an alkylene or an arylene, and R and R' are each independently an alkyl, and R and R' may be the same or different;

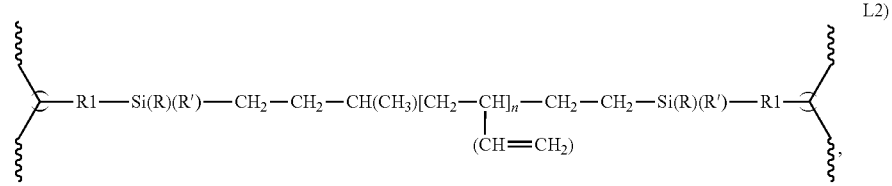
(L2)

where each R1 is an alkylene, R and R' are each independently an alkyl, and R and R' may be the same or different, and n is from 0 to 20;

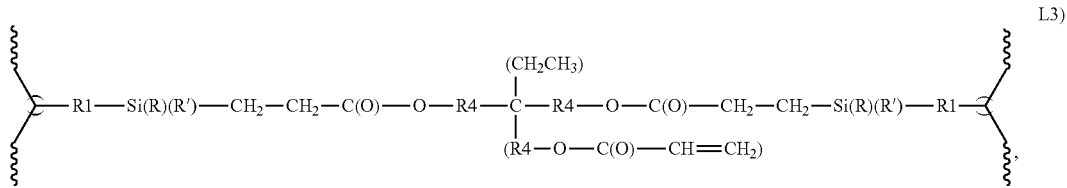

where each $R_1$ is an alkylene, R4 is an alkylene or an arylene, and R and R' are each independently an alkyl, and R and R' may be the same or different;

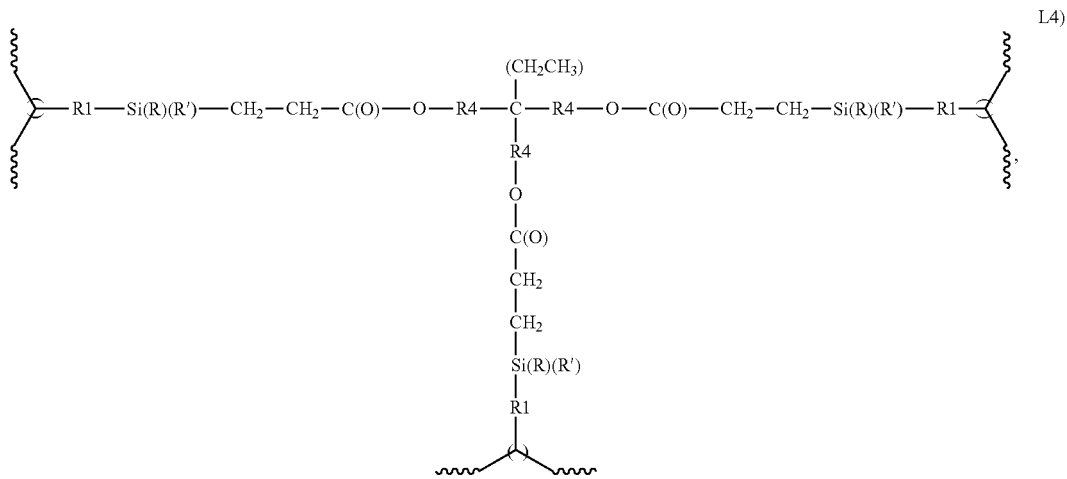

where each $R_1$ is an alkylene, R4 is an alkylene or an arylene, and R and R' are each independently an alkyl, and R and R' may be the same or different;

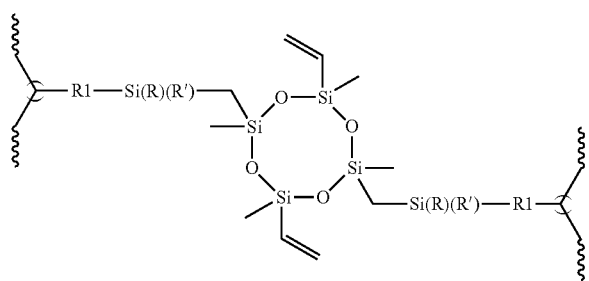

where each $R_1$ is an alkylene, R and R' are each independently an alkyl, and R and R' may be the same or different.

Z2] The crosslinked composition of Y2] above, wherein the crosslinked olefin/silane interpolymer comprises a linkage selected from L1, as a crosslink between interpolymer molecules.

A3] The crosslinked composition of Z2] above, wherein the "—$CH_2$—$CH_2$—R3—$CH_2$—$CH_2$—" moiety is derived from dodecadiene or divinylbenzene.

B3] The crosslinked composition of Y2] above, wherein the crosslinked olefin/silane interpolymer comprises a linkage selected from L2, as a crosslink between interpolymer molecules.

C3] The crosslinked composition of B3] above, wherein the "—$CH_2$—$CH_2$—$CH(CH_3)$—[$CH_2CH(CH$=$CH_2)$]n-$CH_2$—$CH_2$—" moiety is derived from a polybutadiene comprising ≥80 mol %, ≥85 mol %, or ≥90 mol % of 1,2 vinyl groups, based on the total vinyl content, and having a melt viscosity, at 45° C., from 30 to 500 cP, or from 30 to 400 cP, or from 30 to 300 cP, or from 30 to 200 cP, or from 30 to 150 cP, or from 30 to 100 cP.

D3] The crosslinked composition of Y2] above, wherein the crosslinked olefin/silane interpolymer comprises a linkage selected from L3 or L4, as a crosslink between interpolymer molecules.

E3] The crosslinked composition of D3] above, wherein, for linkage L3, the "—$CH_2$—$CH_2$—C(O)—O—$R_4$—C($CH_2$—$CH_3$)[$R_4$—O—C(O)—CH=$CH_2$]—$R_4$—O—C(O)—$CH_2$—$CH_2$—" moiety is derived from trimethylolpropane triacrylate (TMPTA).

F3] The crosslinked composition of D3] above, wherein, for linkage L4, trivalent "—R4-C($CH_2$—$CH_3$)(R4-)(R4-) containing" moiety is derived from trimethylolpropane triacrylate (TMPTA).

G3] The crosslinked composition of Y2] above, wherein the crosslinked olefin/silane interpolymer comprises a linkage selected from L5, as a crosslink between interpolymer molecules.

H3] A composition comprising the following components:
a) an olefin/silane interpolymer,
b) a cure catalyst, and
c) a multi-vinyl compound.

I3] The composition of H3] above, wherein the olefin/silane interpolymer (component a) is an ethylene/alpha-olefin/silane interpolymer, and further an ethylene/alpha-olefin/silane terpolymer.

J3] The composition of I3] above, wherein the alpha-olefin of the ethylene/alphaolefin/silane interpolymer is a C3-C20 alpha-olefin, and further a C3-C10 alpha-olefin, and further propylene, 1-butene, 1-hexene, 1-octene and 1-decene, and further propylene, 1-butene, 1-hexene or 1-octene, and further propylene, 1-butene, or 1-octene, and further 1-butene or 1-octene, further 1-octene.

K3] the composition of any one of H3]-J3] above, wherein the silane of the olefin/silane interpolymer is derived from a compound selected from the following: $H_2C=CH-R_1-Si(R)(R')-H$, where R1 is an alkylene, and R and R' are each independently an alkyl, and R and R' may be the same or different.

L3] the composition of any one of H3]-K3] above, wherein the silane of the olefin/silane interpolymer is derived from a compound selected from the following:

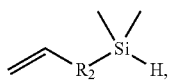

where R2 is an alkylene.

M3] the composition of any one of H3]-L3] above, wherein the silane of the olefin/silane interpolymer is derived from a compound selected from the following:

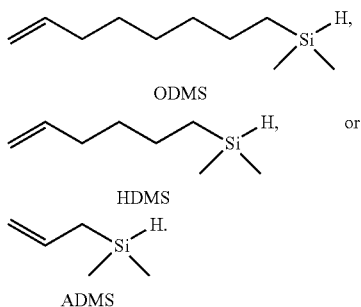

ODMS

HDMS    or

ADMS

N3] The composition of any one of H3]-M3] above, wherein the cure catalyst (component b) comprises platinum (Pt), and further platinum(0)-1,3-divinyl-1,1,3,3-tetramethyldisiloxane.

O3] The composition of any one of H3]-N3] above, wherein the multi-vinyl compound of component c is selected from the following i)-iv):

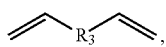

i) R3, where R3 is selected from an alkylene or an arylene;
ii) a polydiene comprising at least one of the following structure: $-(CR1R2-CR3=CR4-CR5R6)_n-(CR7R8-CR9(CR10=CR11R12))_m-$, where each of $R_1$ through $R_{12}$ is, independently, hydrogen (H) or an alkyl, and $n \geq 1$ and $m \geq 1$, and further each of $R_1$ through R12 is hydrogen, and further n is from 1 to 50, or from 1 to 40, or from 1 to 30, or from 1 to 20, and m is from 1 to 50, or from 1 to 40, or from 1 to 30, or from 1 to 20;

iii) $H_3C-CH_2-C[R4-O-C(O)-CH=CH_3]_3$, where R4 is an alkylene or an arylene; or iv) a cyclic siloxane of the following structure $-[Si(CH=CH_2)(R5)-O]n-$, where R5 is an alkyl, and n is from 3 to 6.

P3] The composition of any one of H3]-O3] above, wherein the multi-vinyl compound of component c is selected from the following: dodecadiene, divinylbenzene, tetravinyltetramethylcyclotetrasiloxane (ViD4), trimethylolpropane triacrylate (TMPTA), or a polybutadiene comprising ≥80 mol %, ≥85 mol %, or ≥90 mol % of 1,2 vinyl groups, based on the total vinyl content, and having a melt viscosity, at 45° C., from 30 to 500 cP, or from 30 to 400 cP, or from 30 to 300 cP, or from 30 to 200 cP, or from 30 to 150 cP, or from 30 to 100 cP.

Q3] The composition of any one of H3]-P3] above, wherein the composition further comprises component d: a cure inhibitor.

R3] The composition of Q3] above, wherein the cure inhibitor of component d is selected from the following:

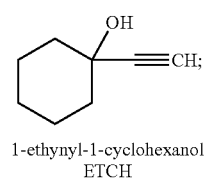

1-ethynyl-1-cyclohexanol
ETCH

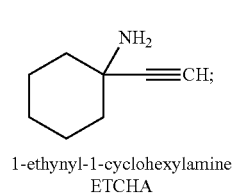

1-ethynyl-1-cyclohexylamine
ETCHA

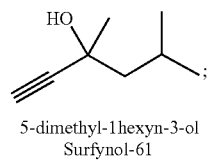

5-dimethyl-1hexyn-3-ol
Surfynol-61

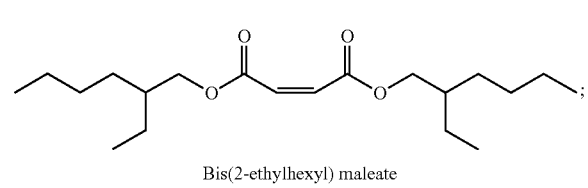

Bis(2-ethylhexyl) maleate

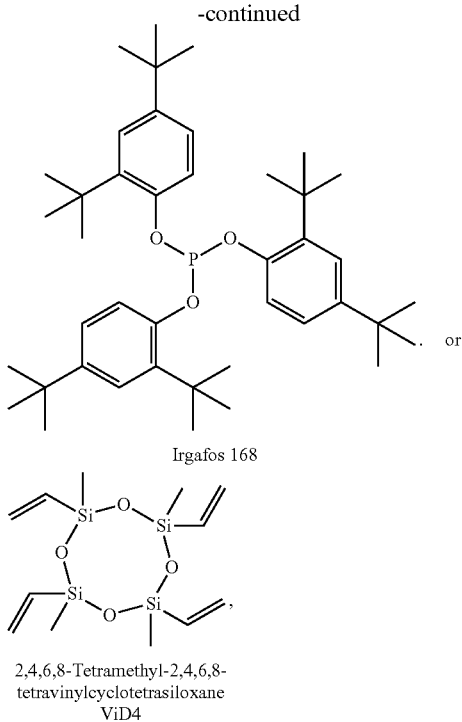

Irgafos 168

2,4,6,8-Tetramethyl-2,4,6,8-tetravinylcyclotetrasiloxane
ViD4 if ViD4 is not used as component c.

S3] The composition of Q3] or R3] above, wherein the cure inhibitor of component d is IRGAFOS 168.

T3] The composition of any one of Q3]-S3] above, wherein the cure inhibitor of component d is added in an amount required to increase the temperature, at which the onset of crosslinking occurs, as determined by DMA (see expt. section below), by ≥20° C., or ≥30° C., or ≥40° C., or ≥50° C., as compared to the same composition that does not contain the component d.

U3] The composition of any one of H3]-T3] above, wherein the composition further comprises component e, selected from the following: IRGANOX 1010, IRGANOX 1076, or a combination thereof.

V3] The composition of U3] above, wherein component e is added in an amount required to decrease the temperature, at which the onset of crosslinking occurs, as determined by DMA (see below), by ≤10° C., or ≤15° C., or ≤20° C., as compared to the same composition that does not contain the component e.

W3] The composition of any one of H3]-V3] above, wherein the composition further comprises a filler, and further the filler is present in an amount from 1.0 wt %, or 2.0 wt %, or 5.0 wt % to 10 wt %, or 15 wt %, or 20 wt %, where each weight percent is based on the weight of the composition.

X3] The composition of any one of H3]-W3] above, wherein the composition is thermally treated at a temperature ≥40° C., or ≥45° C., or ≥50° C., or ≥55° C., or ≥60° C., or ≥65° C., or ≥70° C.

Y3] The composition of any one of H3]-X3] above, wherein the composition is thermally treated at a temperature ≤200° C., or ≤180° C., or ≤160° C., or ≤140° C., or ≤120° C., or ≤100° C.

Z3] The composition of any one of H3]-Y3] above, further comprising, before thermal treatment of the composition comprising components a-c, adding component c to component a, before, or simultaneously with, the addition of component b to component a.

A4] The composition of Z3] above, further comprising adding component c to component a, before the addition of component b to component a.

B4] The composition of Z3] above, further comprising adding component c to component a, simultaneously with the addition of component b to component a.

C4] The composition of any one of H3]-B4] above, wherein component b is present in an amount from 5 to 200 ppm, or from 10 to 100 ppm, based on the weight of the composition.

D4] The composition of any one of H3]-C4] above, wherein the weight ratio of the cure catalyst (component b) to the vinyl compound (component c) is ≥0.0005, or ≥0.0050, or ≥0.0100.

E4] The composition of any one of H3]-D4] above, wherein the weight ratio of the cure catalyst (component b) to the vinyl compound (component c) is ≤10, or ≤8.0, or ≤6.0.

F4] The composition of any one of H3]-E4] above, wherein the composition comprises ≥50.0 wt %, or ≥55.0 wt %, or ≥60.0 wt %, or ≥65.0 wt %, or ≥70.0 wt %, or ≥75.0 wt %, or ≥80.0 wt %, or ≥85.0 wt %, or ≥90.0 wt % of component a, based on the weight of the composition.

G4] The composition of any one of H3]-F4] above, wherein the composition comprises ≤99.9 wt %, or ≤99.5 wt %, or ≤99.0 wt %, or ≤98.5 wt %, or ≤98.0 wt % of component a, based on the weight of the composition.

H4] The composition of any one of H3]-G4] above, wherein the composition has a weight ratio of component a to component c ≥2.00, or ≥2.50, or ≥3.00, or ≥3.50, or ≥4.00.

I4] The composition of any one of H3]—H4] above, wherein the composition has a weight ratio of component a to component c≤100, or ≤95, or ≤90, or ≤85, or ≤80.

J4] The composition of any one of H3]-I4] above, wherein the composition comprises ≥0.20 wt %, or ≥0.30 wt %, or ≥0.40 wt %, or ≥0.50 wt %, or ≥0.60 wt %, or ≥0.70 wt %, or ≥0.80 wt %, or ≥0.90 wt %, or ≥1.00 wt % of component c, based on the weight of the composition.

K4] The composition of any one of H3]-J4] above, wherein the composition comprises ≤50.0 wt %, or ≤40.0 wt %, or ≤30.0 wt %, or ≤20.0 wt %, or ≤10.0 wt %, or ≤5.0 wt % of component c, based on the weight of the composition.

L4] The composition of any one of H3]-K4] above, wherein the composition comprises ≥0 wt %, or ≥0.005 wt %, or ≥0.01 wt %, or ≥0.02 wt %, or ≥0.04 wt %, or ≥0.06 wt %, or ≥0.08 wt % of component d, based on the weight of the composition.

M4] The composition of any one of H3]-L4] above, wherein the composition comprises ≤20.0 wt %, or ≤15.0 wt %, or ≤10.0 wt %, or ≤5.0 wt %, or ≤2.0 wt %, or ≤1.0 wt %, or ≤0.80 wt %, or ≤0.60 wt %, or ≤0.40 wt %, or ≤0.20 wt %, or ≤0.10 wt % of component d, based on the weight of the composition.

N4] The composition of any one of H3]-M4] above, wherein the composition further comprises a solvent.

O4] The composition of any one of H3]-N4] above, wherein the composition comprises ≤1.0 wt, or ≤0.5 wt %, or ≤0.05 wt %, or ≤0.01 wt % of a solvent, based on the weight of the composition.

P4] The composition of any one of H3]-M4] above, wherein the composition does not comprise a solvent.

Q4] The composition of any one of H3]-P4] above, wherein the interpolymer of component a comprises, in polymerized form, from ≥0.20 wt %, or ≥0.40 wt %, or ≥0.60 wt %, or ≥0.80 wt %, or ≥1.00 wt %, or ≥1.20 wt % of the silane (monomer), based on the weight of the interpolymer.

R4] The composition of any one of H3]-Q4] above, wherein the interpolymer of component a comprises, in polymerized form, from ≤10 wt %, or ≤5.0 wt %, or ≤4.0 wt %, or ≤3.8 wt %, or 3.6 wt %, or ≤3.4 wt %, or 3.2 wt %, or 3.0 wt %, of the silane (monomer), based on the weight of the interpolymer.

S4] The composition of any one of H3]-R4] above, wherein the interpolymer of component a comprises, in polymerized form, from ≥20 wt %, or ≥22 wt %, or ≥24 wt %, or ≥26 wt %, or ≥28 wt %, or ≥30 wt % of the alpha-olefin, based on the weight of the interpolymer.

T4] The composition of any one of H3]-S4] above, wherein the interpolymer of component a comprises, in polymerized form, from ≤60 wt %, or ≤58 wt %, or ≤56 wt %, or ≤54 wt %, or ≤52 wt %, or ≤50 wt % of the alpha-olefin, based on the weight of the interpolymer.

U4] The composition of any one of H3]-T4] above, wherein the interpolymer of component a has a molecular weight distribution (MWD=Mw/Mn) ≥1.6, or ≥1.8, or ≥1.9, or ≥2.0.

V4] The composition of any one of H3]-U4] above, wherein the interpolymer of component a has a molecular weight distribution MWD ≤3.0, or ≤2.9, or ≤2.8, or ≤2.7, or ≤2.6.

W4] The composition of any one of H3]-V4] above, wherein the interpolymer of component a has a number average molecular weight (Mn) ≥10,000 g/mol, or ≥12,000 g/mol, or ≥14,000 g/mol ≥16,000 g/mol.

X4] The composition of any one of H3]-W4] above, wherein the interpolymer of component a has a number average molecular weight (Mn)≤100,000 g/mol, or ≤95,000 g/mol, or ≤90,000 g/mol, or ≤85,000 g/mol, or ≤80,000 g/mol, or ≤75,000 g/mol, or ≤70,000 g/mol.

Y4] The composition of any one of H3]-X4] above, wherein the interpolymer of component a has a weight average molecular weight (Mw) ≥30,000 g/mol, or ≥35,000 g/mol, or ≥40,000 g/mol, or ≥45,000 g/mol, or ≥50,000 g/mol, or ≥55,000 g/mol, or ≥60,000 g/mol.

Z4] The composition of any one of H3]-Y4] above, wherein the interpolymer of component a has a weight average molecular weight (Mw)≤200,000 g/mol, or ≤190,000 g/mol, or ≤180,000 g/mol, or ≤170,000 g/mol, or ≤160,000 g/mol, or ≤155,000 g/mol.

A5] The composition of any one of H3]-Z4] above, wherein the interpolymer of component a has a melting temperature Tm ≥40° C., or ≥45° C., or ≥50° C., or ≥55° C., or ≥60° C.

B5] The composition of any one of H3]-A5] above, wherein the interpolymer of component a has a melting temperature Tm ≤120° C., or ≤115° C., or ≤110° C., or ≤105° C., or ≤100° C.

C5] The composition of any one of H3]-B5] above, wherein the interpolymer of component a has a % crystallinity ≥1.8%, or ≥2.0%, or ≥2.1%, or ≥2.2%, or ≥2.3%, or 2.4%.

D5] The composition of any one of H3]-C5] above, wherein the interpolymer of component a has a % crystallinity ≤22%, ≤20%, or ≤18%, or ≤16%, or ≤14%, or ≤13%, or ≤12%.

E5] A crosslinked composition formed from the composition of any one of H3]-D5] above.

F5] The crosslinked composition of E5] above, wherein the crosslinked composition comprises a crosslinked olefin/silane interpolymer comprising a linkage selected from L1 to L5, each as described above, as a crosslink between interpolymer molecules:

G5] The crosslinked composition of F5] above, wherein the crosslinked olefin/silane interpolymer comprises a linkage selected from L1, as described above, as a crosslink between interpolymer molecules.

H5] The crosslinked composition of G5] above, wherein the "—CH$_2$—CH$_2$—R3—CH$_2$—CH$_2$—" moiety is derived from dodecadiene or divinylbenzene.

I5] The crosslinked composition of F5] above, wherein the crosslinked olefin/silane interpolymer comprises a linkage selected from L2, as described above, as a crosslink between interpolymer molecules.

J5] The crosslinked composition of I5] above, wherein the "—CH$_2$—CH$_2$—CH(CH$_3$)—[CH$_2$CH(CH=CH$_2$)]n-CH$_2$—CH$_2$—" moiety is derived from a polybutadiene comprising ≥80 mol %, ≥85 mol %, or ≥90 mol % of 1,2 vinyl groups, based on the total vinyl content, and having a melt viscosity, at 45° C., from 30 to 500 cP, or from 30 to 400 cP, or from 30 to 300 cP, or from 30 to 200 cP, or from 30 to 150 cP, or from 30 to 100 cP.

K5] The crosslinked composition of F5] above, wherein the cured olefin/silane interpolymer comprises a linkage selected from L3 or L4, each as described above, as a crosslink between interpolymer molecules.

L5] The crosslinked composition of K5] above, wherein, for linkage L3, the "—CH$_2$—CH$_2$—C(O)—O—R$_4$—C(CH$_2$—CH$_3$)[R$_4$—O—C(O)—CH=CH$_2$]-R$_4$—O—C(O)—CH$_2$—CH$_2$—" moiety is derived from trimethylolpropane triacrylate (TMPTA).

M5] The crosslinked composition of K5] above, wherein, for linkage L4, trivalent "-R4-C(CH$_2$—CH$_3$)(R4-)(R4-) containing" moiety is derived from trimethylolpropane triacrylate (TMPTA).

N5] The crosslinked composition of F5] above, wherein the cured olefin/silane interpolymer comprises a linkage selected from L5, as described above, as a crosslink between interpolymer molecules.

O5] An article comprising at least one component formed from the composition of any one of X2]-N5] above.

P5] The article of O5], wherein the article is an automotive part, and a building material, or a computer part.

TEST METHODS

1H NMR Characterization of Interpolymers

For the 1H NMR experiments, each polymer sample was dissolved, in an 8 mm NMR tube, in tetrachloroethane-d2 (with or w/o 0.001M Cr(acac)$_3$). The concentration was approximately 100 mg/1.8 mL. The tube was then heated in a heating block set at 110° C. The sample tube was repeatedly vortexed and heated to achieve a homogeneous flowing fluid. The 1H NMR spectra were taken on a BRUKER AVANCE 600 MHz spectrometer, equipped with a 10 mm C/H DUAL cryoprobe. A standard single pulse 1H NMR experiment was performed. The following acquisition parameters were used: 70 seconds relaxation delay, 90 degree pulse of 17.2 s, 32 scans. The spectra were centered at "1.3 ppm" with a spectral width of 20 ppm. All measurements were taken without sample spinning at 110° C. The 1H NMR spectra were referenced to "5.99 ppm" for the resonance peak of solvent (residual protonated tetrachloroethane). For each sample with Cr, the data was taken with 16 second relaxation delay and 128 scans. 1H NMR was used to determine the polymerized silane monomer content (wt %), for example wt % ODMS, in the olefin/silane interpolymer. The "wt % silane monomer" was calculated based on the integration of SiMe proton resonances, versus the integration of $CH_2$ protons associated with ethylene units and $CH3$ protons associated with octene units. The "wt % octene (or other alpha-olefin)" can be similarly determined by reference to the CH3 protons associated with octene units (or other alpha-olefin).

13C NMR Characterization of Interpolymers

For the 13C NMR experiments, each polymer sample was dissolved, in a 10 mm NMR tube, in tetrachloroethane-d2 (with or w/o 0.025 M $Cr(acac)_3$). The concentration was approximately 300 mg/2.8 mL. The tube was then heated in a heating block set at 110° C. The sample tube was repeatedly vortexed and heated to achieve a homogeneous flowing fluid. The 13C NMR spectra were taken on a BRUKER AVANCE 600 MHz spectrometer, equipped with a 10 mm C/H DUAL cryoprobe. The following acquisition parameters were used: 60 seconds relaxation delay, 90 degree pulse of 12.0 s, 256 scans. The spectra were centered at "100 ppm" with a spectral width of 250 ppm. All measurements were taken without sample spinning at 110° C. The 13C NMR spectra were referenced to a "74.5 ppm" for the resonance peak of solvent. For the sample with Cr, the data was taken with 7 second relaxation delay and 1024 scans. The "wt % silane monomer" was calculated based on the integration of SiMe carbon resonances, versus the integration of CH2 carbons associated with ethylene units and CH/CH3 carbons associated with octene units. The "wt % octene (or other alpha-olefin)" can be similarly determined by reference to the CH/CH3 carbons associated with octene units (or other alpha-olefin).

Gel Permeation Chromatography

The chromatographic system consisted of a PolymerChar GPC-IR (Valencia, Spain) high temperature GPC chromatograph, equipped with an internal IR5 infra-red detector (IR5). The autosampler oven compartment was set at 1600 Celsius, and the column compartment was set at 1500 Celsius. The columns were four AGILENT "Mixed A" 30 cm, 20-micron linear mixed-bed columns. The chromatographic solvent was 1,2,4-trichlorobenzene, which contained "200 ppm" of butylated hydroxytoluene (BHT). The solvent source was nitrogen sparged. The injection volume used was 200 microliters, and the flow rate was 1.0 milliliters/minute.

Calibration of the GPC column set was performed with 21 narrow molecular weight distribution polystyrene standards, with molecular weights ranging from 580 to 8,400,000, and which were arranged in six "cocktail" mixtures, with at least a decade of separation between individual molecular weights. The standards were purchased from Agilent Technologies. The polystyrene standards were prepared at "0.025 grams in 50 milliliters" of solvent, for molecular weights equal to, or greater than, 1,000,000, and at "0.05 grams in 50 milliliters" of solvent, for molecular weights less than 1,000, 000. The polystyrene standards were dissolved at 800 Celsius, with gentle agitation, for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad (EQ1),$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects, such that linear homopolymer polyethylene standard was obtained at 120,000 Mw.

The total plate count of the GPC column set was performed with decane (prepared at "0.04 g in 50 milliliters" of TCB, and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max})}{\text{Peak Width at } \frac{1}{2} \text{ height}} \right)^2, \quad (EQ2)$$

where RV is the retention volume in milliliters, the peak width is in milliliters, the peak max is the maximum height of the peak, and ½ height is ½ height of the peak maximum; and $$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, \quad (EQ3)$$

where RB is the retention volume in milliliters, and the peak width is in milliliters, Peak max is the maximum position of the peak, one tenth height is 1/10 height of the peak maximum, and where rear peak refers to the peak tail at later retention volumes than the peak max, and where front peak refers to the peak front at earlier retention volumes than the peak max. The plate count for the chromatographic system should be greater than 18,000, and symmetry should be between 0.98 and 1.22. Samples were prepared in a semi-automatic manner with the PolymerChar "Instrument Control" Software, wherein the samples were weight-targeted at "2 mg/ml," and the solvent (contained 200 ppm BHT) was added to a pre nitrogen-sparged, septa-capped vial, via the PolymerChar high temperature autosampler. The samples were dissolved for two hours at 1600 Celsius under "low speed" shaking.

The calculations of Mn(GPC), Mw(GPC), and MZ(GPC) were based on GPC results using the internal IR5 detector (measurement channel) of the PolymerChar GPC-IR chromatograph according to Equations 4-6, using PolymerChar GPCOne™ Software, the baseline-subtracted IR chromatogram at each equally-spaced data collection point (i), and the polyethylene equivalent molecular weight obtained from the narrow standard calibration curve for the point (i) from Equation 1. Equations 4-6 are as follows:

$$Mn_{(GPC)} = \frac{\sum_{i} IR_i}{\sum_{i} (IR_i / M_{polyethylene_i})}, \quad (EQ4)$$

$$Mw_{(GPC)} = \frac{\sum_{i} (IR_i * M_{polyethylene_i})}{\sum_{i} IR_i}, \quad (EQ5)$$

and $$Mz_{(GPC)} = \frac{\sum_i^i (IR_i * M_{polyethylene_i}^2)}{\sum_i (IR_i * M_{polyethylene_i})}.$$ (EQ6)

In order to monitor the deviations over time, a flowrate marker (decane) was introduced into each sample, via a micropump controlled with the PolymerChar GPC-IR system. This flowrate marker (FM) was used to linearly correct the pump flowrate (Flowrate(nominal)) for each sample, by RV alignment of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate (effective)) for the entire run.

To facilitate the highest accuracy of a RV measurement of the flow marker peak, a leastsquares fitting routine was used to fit the peak of the flow marker concentration chromatogram to a quadratic equation. The first derivative of the quadratic equation was then used to solve for the true peak position. After calibrating the system, based on a flow marker peak, the effective flowrate (with respect to the narrow standards calibration) was calculated from Equation 7: Flowrate(effective)=Flowrate(nominal)*(RV(FM Calibrated)/RV(FM Sample)) (EQ7). Processing of the flow marker peak was done via the PolymerChar GPCOne™ Software. Acceptable flowrate correction is such that the effective flowrate should be within +/−0.7% of the nominal flowrate.

Melt Index

The melt index 12 of an ethylene-based polymer is measured in accordance with ASTM D-1238, condition 190° C./2.16 kg. The melt flow rate MFR of a propylene-based polymer is measured in accordance with ASTM D-1238, condition 230° C./2.16 kg.

Density

ASTM D4703 is used to make a polymer plaque for density analysis. ASTM D792, Method B, is used to measure the density of each polymer.

Differential Scanning Calorimetry (DSC)—Polymer

Differential Scanning Calorimetry (DSC) is used to measure Tm, Tc, Tg and crystallinity in ethylene-based polymer samples. About 5 to 8 mg of sample was weighed and placed in a DSC pan. The lid was crimped on the pan to ensure a closed atmosphere. Unless otherwise stated, the sample pan was placed in a DSC cell, and then heated, at a rate of 10° C./min, to a temperature of 200° C. The sample was kept at this temperature for three minutes. Then the sample was cooled at a rate of 10° C./min to −90° C., and kept isothermally at that temperature for three minutes. The sample was next heated at a rate of 10° C./min, until complete melting (second heat). Unless otherwise stated, melting point (Tm) and the glass transition temperature (Tg) of each polymer were determined from the second heat curve. The peak heat flow temperature for the Tm was recorded.

Dynamic Mechanical Analysis (DMA)

The mechanical properties of a molded disc were characterized by Dynamic Mechanical Analysis (DMA), as a function of temperature or time, using an ARES Rheometer, fitted with 25 mm parallel plates (disposable aluminum), and operated in oscillatory shear mode, at a frequency of 1 rad/sec and strain amplitude of ≤0.1%. After loading the sample disc, a pre-load of 100 g force was used to ensure good contact with the plates. At the start of the run, the environment was cooled and stabilized at 25° C. Unless otherwise noted, a temperature ramp was initiated, and the sample was heated from 25-200° C., at 2° C./min, using heated N2 gas, while the complex viscosity or the shear storage modulus was measured.

Soxhlet Extraction

Each Soxhlet extraction was performed according to ASTM D2765-16. Method A.

Melt Viscosity

The melt viscosity of low viscosity polybutadienes, and other low viscosity polydienes, can be measured using a Brookfield viscometer, at 45° C., and spindle LV-1.

EXPERIMENTAL

Commercial Polymers and Additives

Karstedt's catalyst (Platinum(0)-1,3-divinyl-1,1,3,3-tetramethyldisiloxane complex solution) containing 2 wt % Pt in xylene (Sigma Aldrich). Referred to below as the Karstedt's catalyst.

Very low molecular weight polybutadiene (Sigma Aldrich; melt viscosity 30-100 cP, at 45° C.) containing 90 mol % of 1,2 vinyl content, based on total vinyl content in the polybutadiene. Referred to below as "the polybutadiene."

Bis(2-ethyl, hexyl) maleate, available from Sigma Aldrich.

1-Ethynyl-1-cyclohexanol, "ETCH", 99%, available from Sigma Aldrich.

Surfynol-61, available from Sigma Aldrich.

Tetravinyltetramethylcyclotetrasiloxane (ViD4), available from Sigma Aldrich.

Polymerizations

The ethylene/octene/silane co-polymerizations were conducted in an autoclave batch reactor designed for ethylene homo-polymerizations and co-polymerizations. The reactor was equipped with electrical heating bands, and an internal cooling coil containing chilled glycol. Both the reactor and the heating/cooling system were controlled and monitored by a process computer. The bottom of the reactor was fitted with a dump valve, which emptied the reactor contents into a dump pot that was vented to the atmosphere.

All chemicals used for polymerization and the catalyst solutions were run through purification columns prior to use. The ISOPAR-E, 1-octene, ethylene, and the silane monomers were also passed through columns. Ultra-high purity grade nitrogen (Airgas) and hydrogen (Airgas) were used. The catalyst cocktail was prepared by mixing, in an inert glove box, the scavenger (MMAO), activator (bis(hydrogenated tallow alkyl)methyl tetrakis(pentafluoro-phenyl)borate(1≤-≥) amine), and catalyst, with the appropriate amount of toluene, to achieve a desired molarity solution. The solution was then diluted with ISOPAR-E or toluene, to achieve the desired quantity for the polymerization, and drawn into a syringe for transfer to a catalyst shot tank.

In a typical polymerization, the reactor was loaded with ISOPAR-E, and 1-octene via independent flow meters. The silane monomer was then added via a shot tank, piped in through an adjacent glove box. After the solvent/comonomer addition, hydrogen (if desired) was added, while the reactor was heated to a polymerization setpoint of 120° C. The ethylene was then added to the reactor via a flow meter, at the desired reaction temperature, to maintain a predetermined reaction pressure set point. The catalyst solution was transferred into the shot tank, via syringe, and then added to the reactor via a high pressure nitrogen stream, after the reactor pressure set point was achieved. A run timer was started upon catalyst injection, after which, an exotherm was observed, as well as a decrease in the reactor pressure, to indicate a successful run.

Ethylene was then added using a pressure controller to maintain the reaction pressure set point in the reactor. The polymerizations were run for a set time or ethylene uptake, after which, the agitator was stopped, and the bottom dump valve was opened to empty the reactor contents into dump pot. The pot contents were poured into trays, which were placed in a fume hood, and the solvent was allowed to evaporate overnight. The trays containing the remaining polymer were then transferred to a vacuum oven, and heated to 100° C., under reduced pressure, to remove any residual solvent. After cooling to ambient temperature, the polymers were weighed for yield/efficiencies, transferred to containers for storage, and submitted for analytical testing. See Tables 1A, 1B and 1C.

TABLE 1A

Polymerization Conditions

| Terpolymer | CAT | Reactor Pressure (psi) | Reactor Size (L) | Reaction end point (min) |
|---|---|---|---|---|
| 1 | 3 | 115.5 | 2 | 8.1 |
| 2 | 1 | 108.1 | 3.79 | 10 |
| 3 | 1 | 123.5 | 2 | 7.4 |
| 4 | 1 | 107.4 | 3.79 | 10 |

TABLE 1A-continued

Polymerization Conditions

| Terpolymer | CAT | Reactor Pressure (psi) | Reactor Size (L) | Reaction end point (min) |
|---|---|---|---|---|
| 5 | 1 | 125.4 | 2 | 11.9 |
| 6 | 1 | 132.7 | 2 | 8.5 |

TABLE 1B

Polymerization Conditions

| Terpolymer | Ethylene loaded (g) | Octene loaded (g) | Silane monomer | Silane monomer loaded (mL) | Solvent loaded (g) | $H_2$ loaded (mmol) |
|---|---|---|---|---|---|---|
| 1 | 11.2 | 23.7 | ODMS | 4 | 580.7 | n/a |
| 2 | 23.8 | 163.3 | ODMS | 8 | 1145.7 | 20.1 |
| 3 | 12.4 | 63.5 | ODMS | 4 | 604.3 | 4.7 |
| 4 | 22.3 | 162.5 | ODMS | 8 | 1128.6 | 10.1 |
| 5 | 12.1 | 50.2 | HDMS | 3.5 | 592.7 | 4.6 |
| 6 | 12.2 | 57.7 | ODMS | 4 | 604.5 | 4.7 |

TABLE 1C

Catalysts

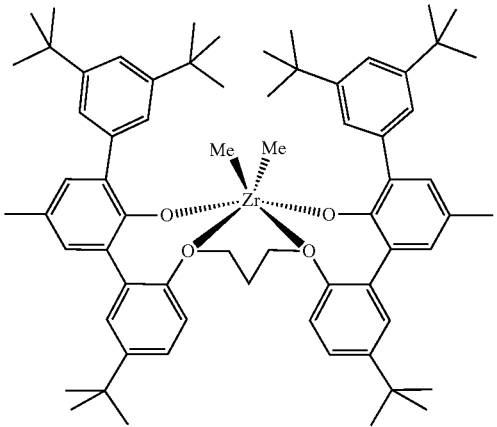

CAT 1

(WO2007/136496)

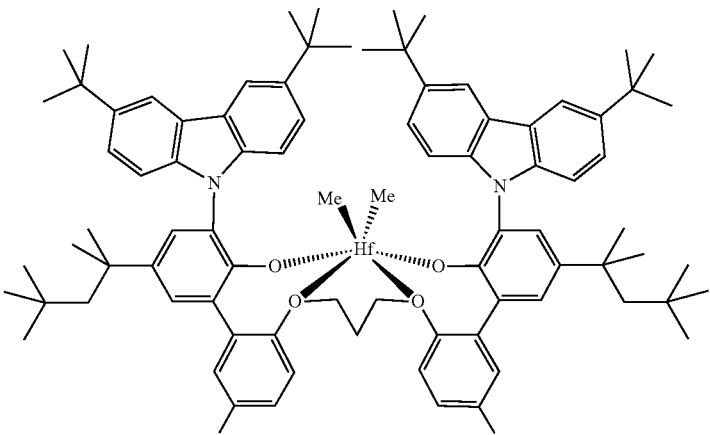

CAT 2

(WO2012/027448)

TABLE 1C-continued

Catalysts

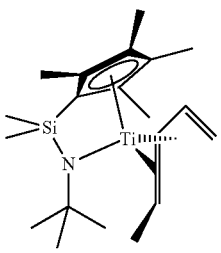

CAT 3

(WO1995/000526)

Study 1: DSC of Solution Prepared Pt Vulcanizable Formulation

Terpolymer 1 (3.0 wt % octenyldimethylsilane (ODMS, 1H NMR), 31.6 wt % octene (1H NMR), with the remainder being ethylene; was dissolved in toluene at 50° C., at a loading of "0.80 g terpolymer/15 g toluene." The terpolymer 1 had a Mn=17,000 g/mol and Mw=41,000 g/mol, a peak melting temperature of 95.4° C., and an integrated melting enthalpy of 33.4 J/g (equivalent to 11.4% crystallinity, assuming a pure crystal melting enthalpy of 293 J/g, measured via differential scanning calorimetry (DSC) at a heating rate of 10° C./min. This solution is Solution A.

A separate Solution B was prepared, containing 10.0 g toluene with 0.20 g of the polybutadiene. The solution was heated to 50° C., with shaking, to dissolve the viscous liquid polymer in the solvent. The Karstedt's catalyst was diluted to 0.01 wt % Pt (based on sum weight of catalyst and toluene) by addition of toluene. A small quantity (0.20 g) of this diluted catalyst solution (containing 0.01 wt % Pt) was added to Solution B.

Sealed glass vials of Solutions A and B were both separately heated to 60° C., in a hot water bath, giving clear, homogeneous fluids. Solutions A and B were combined, and mixed by shaking, to yield a clear fluid containing 20 ppm Pt (based on terpolymer and polybutadiene mass). The mixed solution was poured into a PTFE mold (10 cm×10 cm×0.5 cm), and the filled mold was allowed to dry in a lab hood, overnight, to evaporate the toluene. Soft, gelatinous pieces of formulated terpolymer were peeled and scraped from the mold, and further dried in the lab hood for an additional 24 hours or more.

Figure 2:
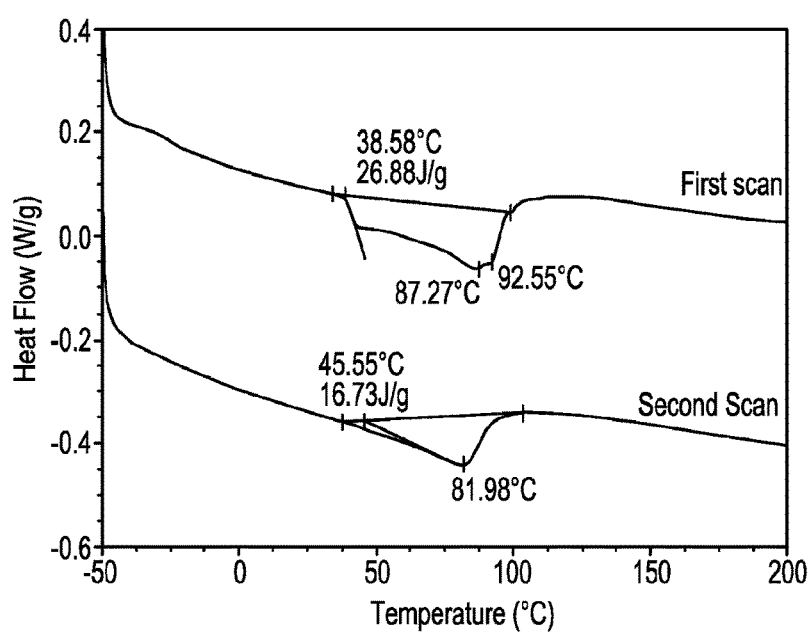
FIG. 2 depicts two sequential DSC scans for an olefin/silane interpolymer (80 wt % interpolymer/20 wt % PBd) with 20 ppm Pt catalyst.

After drying for 48 hours, approximately 7 mg of the formulated terpolymer was loaded into a hermetically sealed DSC pan, and scanned in a TA Instruments Q1000 DSC unit. Results are shown in FIG. 2. Multiple successive scans were run, where the sample was equilibrated at −50° C., heated from −50° C. to 250° C., at 10° C./min, and then cooled from 250° C. to −50° C., at −10° C./min. On the first scan, the sample showed a broad multi-modal melting endotherm extending from 38° C. to 99° C., with a highest peak melting temperature of 92.6° C. The integrated melting enthalpy was 26.9 J/g (9.0% crystalline; 80% of the value measured for the neat terpolymer).

During the second scan, the sample showed a broad melting endotherm extending from 38° C. to 101° C., but exhibited only one peak with a melting temperature of 82.0° C. The integrated melting enthalpy decreased to 16.55 J/g, corresponding to a crystallinity of only 5.65%. The significant decreases in peak melting temperature and integrated enthalpy, after the first scan, indicate that heating above the melting point during the first scan induced a hydrosilylation based crosslinking in the terpolymer. These crosslinks inhibited polymer chain mobility during the cooling between the first and second scans, significantly limiting the ability of the chains to crystallize and leading to the observed declines in percent crystallinity and peak melting temperature.

Study 2: Shear Rheology of Solution Prepared Pt Vulcanizable Formulations with Inhibitor Terpolymer 1 was dissolved in toluene at 50° C., at a loading of "1.0 g polymer/15 g toluene." After dissolution of the terpolymer was complete, 0.10 g of a 0.1 wt % solution of bis(2-ethyl, hexyl) maleate, in toluene, was added to the terpolymer solution in toluene. This solution is Solution A.

A separate Solution B was prepared, which contained 5.0 g toluene with 0.020 g of the polybutadiene. The solution was heated to 50° C., with shaking, to dissolve the polybutadiene in the solvent. The Karstedt's catalyst was diluted to 0.01 wt % Pt (based on sum weight of catalyst and toluene) by addition of toluene. A small quantity (0.10 g) of this diluted catalyst solution (containing 0.01 wt % Pt) was added to Solution B.

Sealed glass vials of Solutions A and B were both separately heated to 60° C., in a hot water bath, giving clear, homogeneous fluids. Solutions A and B were combined and mixed, by shaking, to yield a clear fluid containing 10 ppm Pt (based on sum weight of terpolymer and polybutadiene) and 100 ppm bis(2-ethyl, hexyl) maleate (based on weight of terpolymer). The mixed solution was poured into a PTFE mold (10 cm×10 cm×0.5 cm), and the filled mold was allowed to dry in a lab hood overnight to evaporate the toluene. A cloudy elastomeric film was peeled from the mold, turned over in the mold, and dried in the lab hood for an additional 24 hours.

The resultant film was cut into pieces, and 0.70 g were placed into a flat disc mold (25 mm diameter×2 mm deep), sandwiched between steel plates with PTFE film liners. This assembly was placed between the platens of a Carver Press, thermostatically controlled at 120° C. The assembly was first preheated without pressure for two minutes. It was then pressurized to 13800 kPa (2000 psig), and held under pressure for 30 seconds. The pressure was released, and the assembly was cooled between water-cooled platens for two minutes. An opaque white disc with flat, smooth top and bottom surfaces was recovered, and minor flashing around the exterior was trimmed with scissors.

Figure 3:
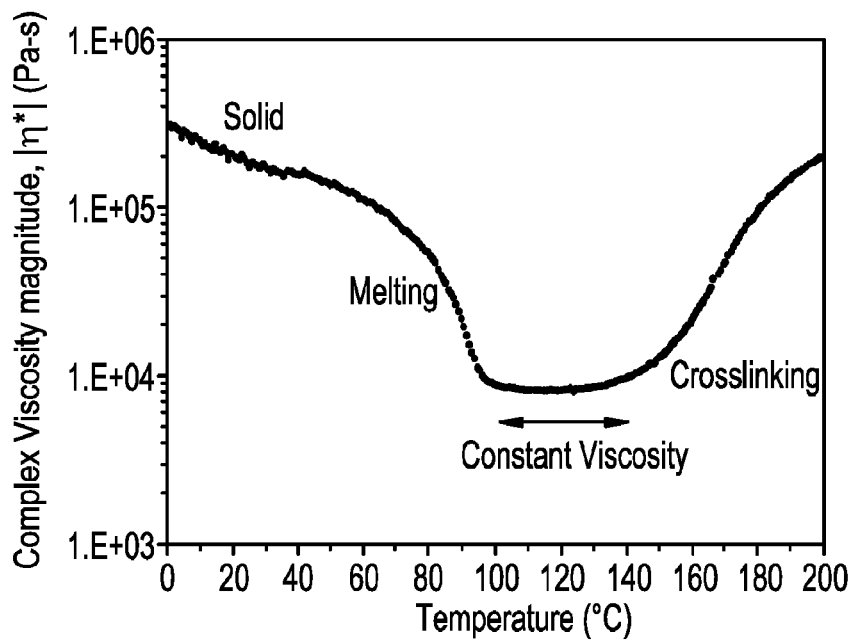
FIG. 3 depicts a plot of the magnitude of the "complex viscosity vs. temperature" for an olefin/silane interpolymer containing 3.0 wt % ODMS, and formulated with 2% by weight of a very low molecular weight polybutadiene resin containing 90 mol %1,2 vinyl content, 10 ppm Pt catalyst, and 100 ppm bis(2-ethyl, hexyl) maleate.

The mechanical properties of the molded disc were characterized by dynamic mechanical analysis (DMA), as a function of temperature. FIG. 3 shows the response, plotted as $|\eta^*|$ (Pa·s), the magnitude of the complex viscosity, versus temperature (° C.). The profile in FIG. 3 shows four distinct regions. At low temperatures (0-70° C.), the sample exhibits solid-like behavior, where the magnitude of the complex viscosity is high and declines slowly with increasing temperature. At slightly higher temperatures (70-95° C.), the viscosity decreases rapidly with increasing temperature as the terpolymer crystallites melt.

At temperatures in the range 95-approx. 140° C., the viscosity is low (liquid-like) and nearly constant with temperature. Finally, at still higher temperatures (140-200° C.), the viscosity increases significantly with increasing temperature, reaching values consistent with solid-like behavior once again, and indicative of crosslinking.

Comparative Study 1: Shear Rheology of Solution Prepared Formulation with no Pt and No Multi-Vinyl Compound A DMA disc (25 mm diameter×2 mm thick) was compression molded, as described in Study 2, from terpolymer 2 containing 1.3 wt % octenyldimethylsilane (ODMS, 1H NMR, 13C NMR), 41.9 wt % octene (1H NMR, 13C NMR), with the remainder being ethylene.

Terpolymer 2 had a Mn=43,000 g/mol and Mw=91,000 g/mol, a peak melting point of 60.2° C. and a percent crystallinity of 2.6% via differential scanning calorimetry (DSC) at a heating rate of 10° C./min.

Figure 4:
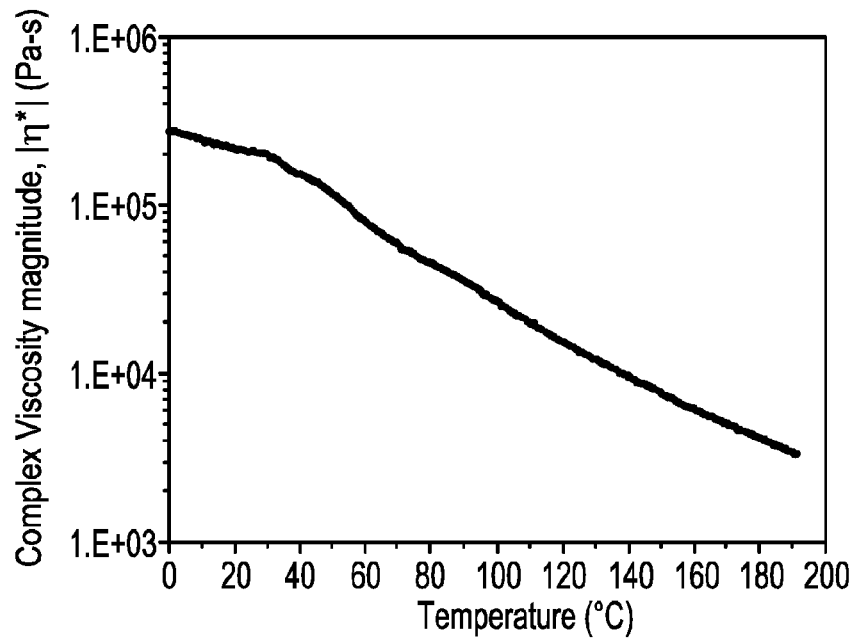
FIG. 4 depicts a plot of the magnitude of the "complex viscosity vs. temperature" for a neat ethylene/octene/silane interpolymer containing 1.3 wt % ODMS, and 41.9 wt % octene.

The mechanical properties of the molded disc were characterized by dynamic mechanical analysis (DMA) as a function of temperature. FIG. 4 shows the response, plotted as |η*| (Pa·s), the magnitude of the complex viscosity, vs. temperature (° C.). The profile in FIG. 4 shows a gradual decline in viscosity with increasing temperature. No regions of fairly constant viscosity or increasing viscosity are evident in the thermal sweep data. This indicates that the hydrosilylation, responsible for crosslinking the polyolefin, does not occur in the absence of the multi-vinyl compound and the catalyst.

Study 3: Shear Rheology of Solution Prepared Pt Vulcanizable Formulations

Terpolymer 2 was dissolved in in toluene at 50° C., at a loading of "2.0 g polymer/20 g toluene." This solution is Solution A. The polybutadiene was dissolved in toluene at 50° C., at a loading of 0.023 g polymer/10 g toluene. A small quantity (0.22 g) of diluted Karstedt's catalyst (containing 0.01 wt % Pt) was added to the "polybutadiene solution"- Solution B.

Solutions A and B were combined to yield a clear fluid containing terpolymer 2/polybutadiene at a 99/1 weight ratio along with 10 ppm Pt (based on the sum weight of the terpolymer and the polybutadiene). The mixed solution was poured into a PTFE mold (10 cm×10 cm×0.5 cm), and the filled mold was allowed to dry in a lab hood overnight. A cloudy elastomeric film was peeled from the mold, turned over in the mold, and dried in the lab hood for an additional 24 hours.

Figure 5:
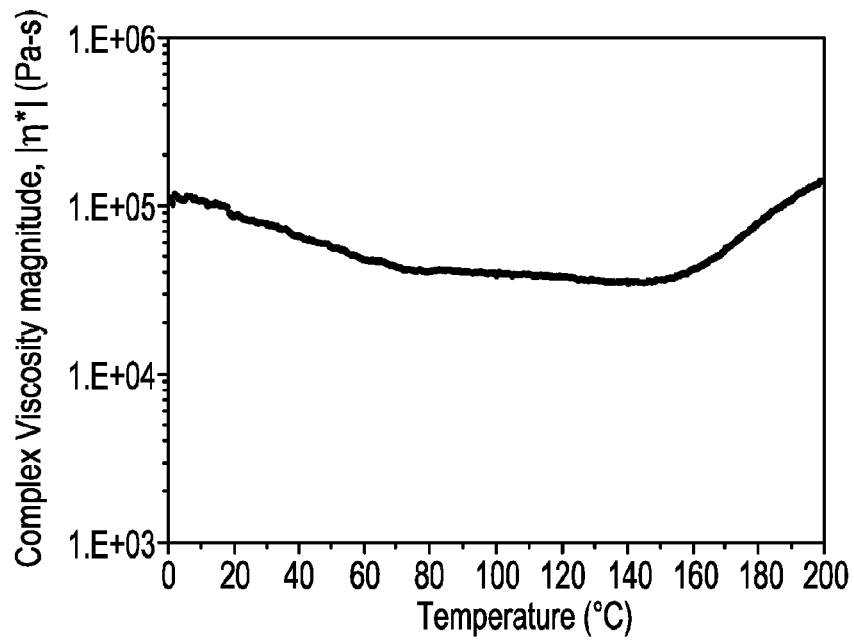
FIG. 5 depicts a plot of the magnitude of the "complex viscosity vs. temperature" for an olefin/silane interpolymer containing 1.3 wt % ODMS, and formulated with 1% by weight of a very low molecular weight polybutadiene resin containing 90 mol % 1,2 vinyl content, and 10 ppm Pt catalyst.

The resultant film was cut into pieces and compression molded (as discussed in Study 2) to give "25 mm diameter×2 mm thick" DMA discs. FIG. 5 shows the response, plotted as |η*| (Pa·s), the magnitude of the complex viscosity, vs. temperature (° C.). The profile in FIG. 5 shows three distinct regions. At low temperatures (0-70° C.), the sample exhibits a steady, monotonic decrease in the magnitude of the complex viscosity with increasing temperature. At higher temperatures, the rate of viscosity decline slows significantly, and the value is almost constant over the temperature range 70-150° C. At still higher temperatures, (150-200° C.), the viscosity increases significantly as the temperature goes up, indicating that the hydrosilylation based crosslinking reaction is underway.

Study 4: Shear Rheology of Melt Prepared Pt Vulcanizable Formulation

Figure 6:
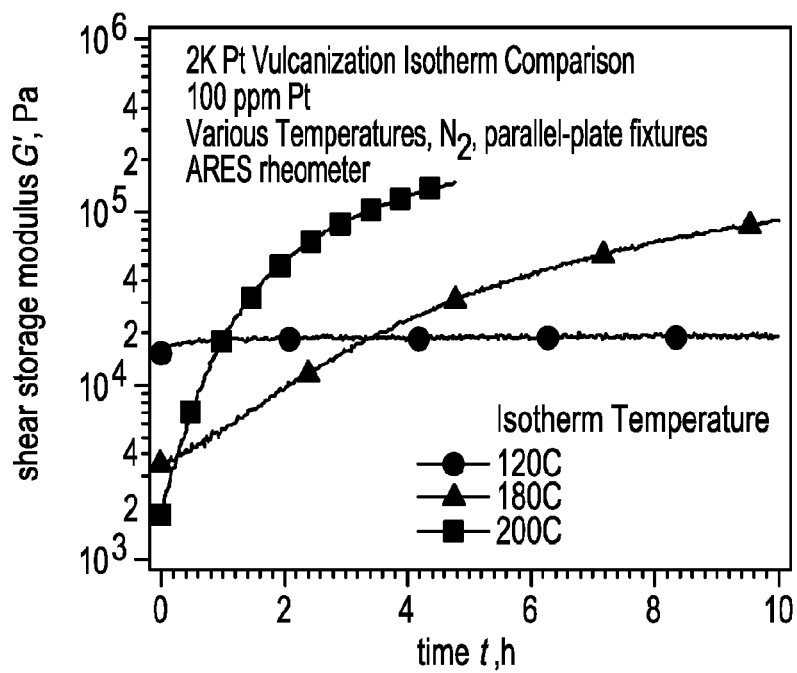
FIG. 6 depicts isotherms of melt blended olefin/silane interpolymer (98 wt %), polybutadiene multi-vinyl crosslinker (2 wt %) and 100 ppm Pt catalyst, which show the shear storage modulus growth over time. Shear storage modulus growth can be directly correlated to crosslink density.

Terpolymer 3 (15 g) containing 2.1 wt % octenyldimethylsilane (ODMS, 1H NMR), 47.9 wt % octene (1H NMR), and the balance ethylene was melted using a HAAKE melt blender set to 90° C., with a blade speed of 60 rpm. Terpolymer 3 had an Mn=53,000 g/mol and Mw=136,000 g/mol. The polybutadiene (2 wt %, based on the sum weight of the terpolymer and the poly-butadiene) was then added to the melt blender, as the multi-vinyl compound. After fluxing for three minutes, 100 ppm Pt from the Karstedt's catalyst (based on the sum weight of the terpolymer and the polybutadiene) was added to the mixer, and fluxed for one minute, until homogenized. DMA disks (25 mm diameter×2 mm thick) were compression molded using a Carver Press (20,000 lbs of force, 80° C., 1 minute), and then cooled immediately between water-cooled platens for two minutes. The resulting samples were then tested, using a series of isothermal time sweeps (T=120° C., 180° C., 200° C.), with an ARES rheometer (25 mm disposable aluminum parallel plates, 1.0% strain amplitude, frequency of 1 rad/sec, tested under N2 gas). The data from these tests is shown in FIG. 6. These data demonstrate the ability to melt blend a silane terpolymer, a multi-vinyl compound, and a Pt catalyst, in a solvent-less process, to form a vulcanizable formulation. The data also show that the vulcanization process follows Arrhenius-like kinetics, as increased temperature leads to faster shear storage modulus growth, which is directly correlated to crosslink density. The sample tested at 120° C. showed minimal crosslinking during testing. The higher temperature isotherms show substantially higher degree of crosslinking in shorter periods of time. It was also discovered that the order of addition of components (terpolymer, then multi-vinyl compound, then Pt catalyst) was important to maintaining catalyst stability in the polymer melt. If the catalyst was added before the multi-vinyl compound, there was visual destabilization of the Pt complex in the terpolymer formulation, as seen by irregular spots of various sizes within the DMA disk.

Figure 7:
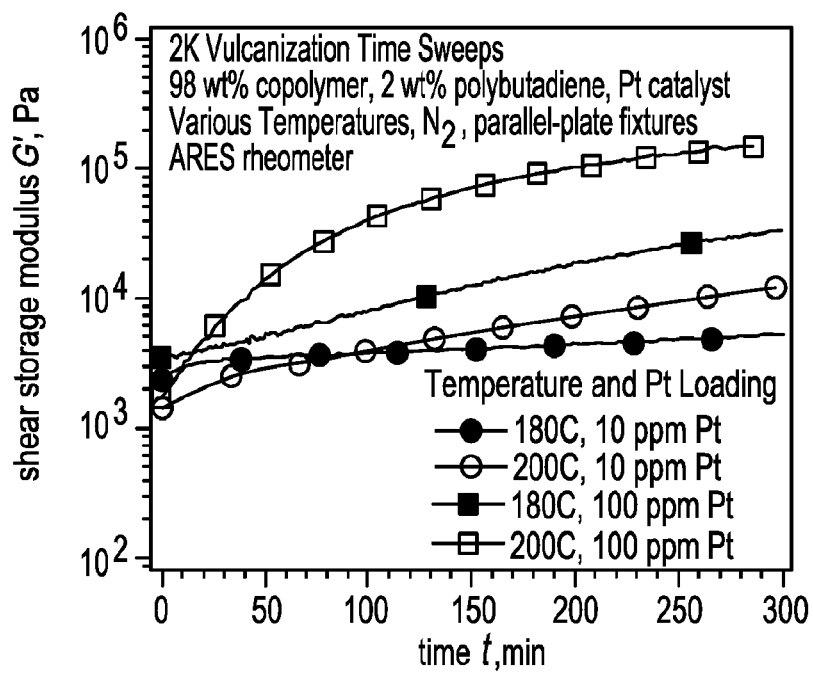
FIG. 7 depicts isotherms of melt blended olefin/silane interpolymer (98 wt %), polybutadiene multi-vinyl crosslinker (2 wt %) and either 10 ppm of 100 ppm Pt catalyst, which show the shear storage modulus growth over time.

Study 5: Shear Rheology of Melt Prepared Pt Vulcanizable Formulations Tunable by Catalyst Addition Terpolymer 3 (15 g) was melted using a HAAKE melt blender set to 90° C., with a blade speed of 60 rpm. The polybutadiene (2 wt % based on sum weight of the terpolymer and the polybutadiene) was then added to the melt blender, as the multi-vinyl compound. After fluxing for three minutes, either 10 ppm or 100 ppm of Pt, (based on the sum weight of the terpolymer and the polybutadiene) from the Karstedt's catalyst (2 wt % in xylenes) was added to the mixer, and the resulting composition was fluxed for one minute until homogenized. DMA disks (25 mm diameter×2 mm thick) were compression molded using a Carver Press (20,000 lbs of force, 80° C., 1 minute), and then cooled immediately between water-cooled platens for two minutes. The resulting samples were then tested using a series of isothermal time sweeps (T=180° C., 200° C.) with an ARES rheometer (25 mm disposable aluminum parallel plates, 1.0% strain amplitude, frequency of 1 rad/sec, tested under N2 gas). The data from these tests are shown in FIG. 7. These data demonstrate the ability to control the rate of crosslinking by adding varying amounts of Pt catalyst, in a solvent-less process, to a vulcanizable formulation. It had been discovered that the rate of crosslink density growth is governed by both catalyst loading and vulcanization temperature. The data shows that catalyst loading is the more sensitive handle, with which to tune modulus growth.

Study 6: Shear Rheology of Melt Prepared Pt Vulcanizable Formulations Tunable with Inhibitor Terpolymer 4 (15 g), containing 1.6 wt % octenyldimethylsilane (ODMS, 1H NMR, 13C NMR), 44.4 wt % octene (1H NMR, 13C NMR), and the balance ethylene, was melted using a HAAKE melt blender set to 90° C., with a blade speed of 60 rpm. Terpolymer 4 had an Mn=66,000 g/mol and Mw=142,000 g/mol. The polybutadiene (2 wt % based on sum weight of the terpolymer and the polybutadiene) was then added to the melt blender, as the multi-vinyl compound. After fluxing for three minutes, either 0 ppm or 10 ppm Pt (based on the sum weight of the terpolymer and the polybutadiene) from the Karstedt's catalyst was added to the mixer, and the resulting composition was fluxed for one minute until homogenized. In one of the samples, 1000 ppm (based on the sum weight of the terpolymer and the polybutadiene) of an inhibitor (1-ethynyl-1-cyclohexanol, "ETCH", 99%, Sigma) was added prior to adding the Pt catalyst.

Figure 8:
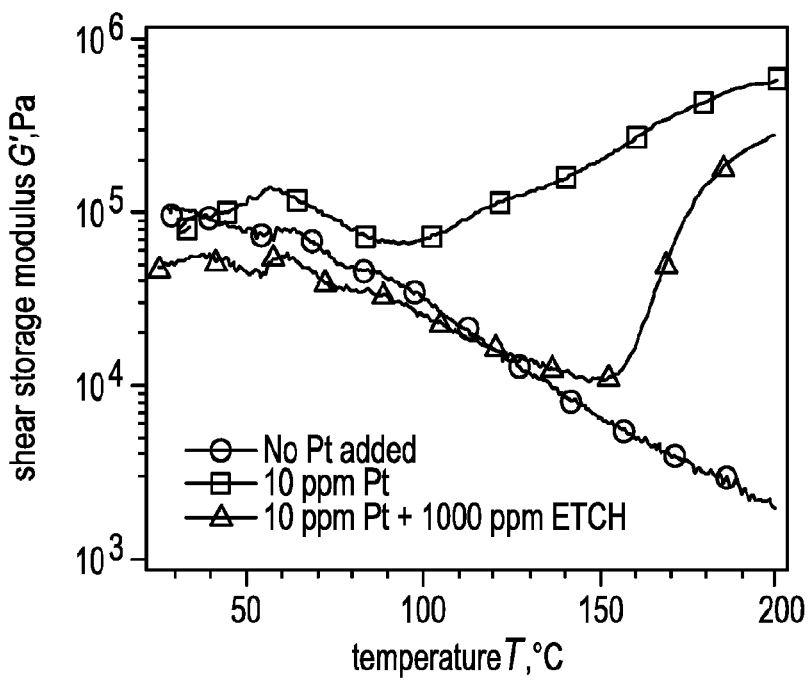
FIG. 8 depicts three Dynamic Mechanical Analysis (DMA) profiles of a temperature ramp from 25° C. to 200° C., at 2° C./min, for samples of an olefin/silane interpolymer with no Pt, with 10 ppm Pt and no inhibitor, and with 10 ppm and 1000 ppm of ETCH inhibitor.

Dynamic Mechanical Analysis (DMA) disks (25 mm diameter by 2 mm thick) were compression molded using a Carver Press (20,000 lbs of force, 80° C., 1 minute), and then cooled immediately between water-cooled platens for two minutes. The resulting samples were then tested using a DMA procedure (2° C./min ramp rate, 25° C.-200° C. temperature range) with an ARES rheometer (25 mm disposable aluminum parallel plates, 1.0% strain amplitude, frequency of 1 rad/sec, tested under N2 gas). The data is shown in FIG. 8. This data shows that when no Pt catalyst (0 ppm) is added to the formulation, the shear storage modulus of the sample will monotonically decrease as a function of increasing temperature, during the DMA. No crosslinking is observed in this sample. When 10 ppm Pt is added to the sample (with no inhibitor added), crosslinking is observed. The DMA trace can be segmented into the warming region (25° C.-60° C.), the melting region (60° C.-90° C.), and the crosslinking region (90° C.-200° C.). The warming region shows some stress relaxation through expansion of the sample, which can lead to a small increase in storage modulus as a function of temperature. The melting region is characterized by a decrease in storage modulus, as added thermal energy allows individual polymer chains to become more mobile.

The crosslinking region is characterized by an increase is shear storage modulus. This is due to the progression of the hydrosilylation reaction, creating covalent crosslinks between the silane and multi-vinyl compound, as it is catalyzed by the Pt. When examining the sample that includes 10 ppm Pt and 1000 ppm ETCH inhibitor, the temperature ranges are shifted. In this sample, the warming region continues to be observed from 25° C.-60° C., however the melting region temperature range is now extended from between 60° C.-150° C. This is due to the ETCH inhibitor temporarily complexing with the vinyl groups in the Pt catalyst, inhibiting the hydrosilylation reaction from occurring. As the temperature of the system is elevated, eventually the added thermal energy is enough to cause a dissociation between the ETCH inhibitor and the Pt complex. The Pt is now considered active, and the crosslinking region begins (150° C.-200° C.). This demonstrates the ability to melt blend a multi-vinyl compound, an inhibitor, and a precious metal catalyst complex, to form a ratecontrolled vulcanizable formulation. This inhibited catalysis can better allow for controlled processability of these formulations.

Study 7: Shear Rheology of Melt Prepared Pt Vulcanizable Formulations Tunable with Additional Classes of Inhibitors Terpolymer 5 (15 g) containing 2.4 wt % hexenyldimethylsilane (HDMS, 1H NMR), 48.3 wt % octene (1H NMR), and the balance ethylene, was melted using a HAAKE melt blender set to 90° C., with a blade speed of 60 rpm. Terpolymer 4 had an Mn=54,000 g/mol and Mw=141,000 g/mol. The polybutadiene (2 wt % based on sum weight of the terpolymer and the polybutadiene) was then added to the melt blender, as the multi-vinyl compound. After fluxing for three minutes, 1000 ppm (based on sum weight of the terpolymer and the polybutadiene) of an inhibitor (either ETCHA, Surfynol-61, or ViD4) was added, and the formulation was fluxed for another three minutes. After homogenization, 100 ppm of Pt (based on the sum weight of the terpolymer and the polybutadiene) from the Karstedt's catalyst was added to the mixer, and the resulting composition was fluxed for one minute until homogenized.

Figure 9:
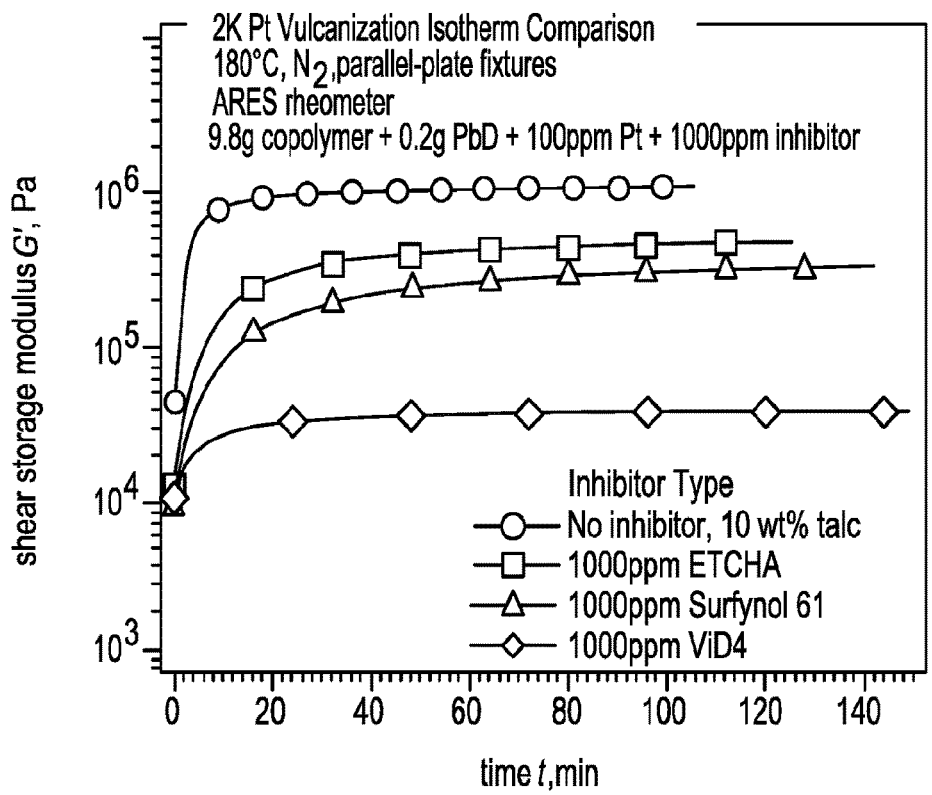
FIG. 9 depicts isotherms of melt blended olefin/silane interpolymer (98 wt %), polybutadiene multi-vinyl crosslinker (2 wt %), 1000 ppm of various inhibitors, and 100 ppm Pt catalyst, which show the shear storage modulus growth over time.
Figure 10:
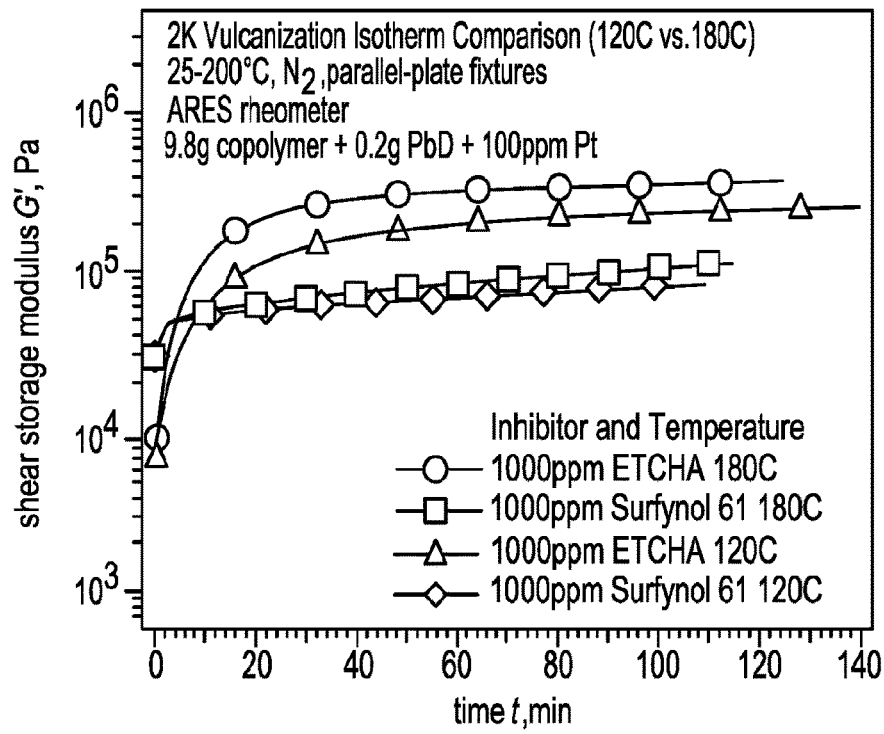
FIG. 10 depicts isotherms at 120° C. and 180° C. of samples containing 98 wt % olefin/silane interpolymer, 2 wt % polybutadiene, 1000 ppm of inhibitor (ETCHA or Surfynol-61) and 100 ppm Pt catalyst.

Dynamic Mechanical Analysis (DMA) disks (25 mm diameter by 2 mm thick) were compression molded using a Carver Press (20,000 lbs of force, 80° C., 1 minute), and then cooled immediately between water-cooled platens for two minutes. The resulting samples were then tested using isothermal time sweeps (T=180° C.) with an ARES rheometer (25 mm disposable aluminum parallel plates, 1.0% strain amplitude, frequency of 1 rad/sec, tested under N2 gas). The data from these tests are shown in FIG. 9. This data show that adding the same weight percent loading of the various inhibitors to the polymer system lead to different shear storage modulus plateaus. The rate at which the storage modulus plateau is reached varies based on the type of inhibitor used. These data suggest that the system with "added ViD4" is the most strongly inhibited, with minimal crosslinking observed. The systems using ETCHA and Surfynol-61 may bind less strongly to the Pt complex, allowing for higher reactivity, in shorter amounts of time, at an elevated temperature. These data suggest that different types of inhibitors can be used to tune reactivity, based on expected processing conditions. It should also be noted that the control sample was filled with 10 wt % talc (based on the weight of the terpolymer, polybutadiene and talc), demonstrating that these systems can hold inorganic, nonreactive fillers without greatly affecting cure properties. A further examination (with 1000 ppm of ETCHA and Surfynol-61) used two different isothermal time sweeps (T=120° C., 180° C.), to look for further differentiation, as shown in FIG. 10. The lower temperature isotherms (120° C.) show little difference in degree of inhibition, the higher temperature isotherms (180° C.) begin to show that ETCHA may bind less strongly to the Pt complex compared to Surfynol-61.

Study 8: Shear Rheology of Melt Prepared Pt Vulcanizable Formulations with Common Antioxidants Terpolymer 6 (15 g) containing 1.7 wt % octenyldimethylsilane (ODMS, 1H NMR), 42.1 wt % octene (1H NMR), and the balance ethylene, was melted using a HAAKE melt blender set to 90° C., with a blade speed of 60 rpm. Terpolymer 6 had an Mn=59,000 g/mol and Mw=153,000 g/mol. The polybutadiene (2 wt % based on sum weight of the terpolymer and the polybutadiene) was then added to the melt blender, as the multi-vinyl compound. After fluxing for three minutes, different amounts of IRGANOX 1010 (750 ppm or 1500 ppm), IRGANOX 1076 (200 ppm or 1500 ppm), or IRGAFOS 1680 (750 ppm or 1500 ppm; similar to IRGAFOS 168) were added as a 10 wt % solution dissolved in 100 uL of toluene. Each "ppm" amount is based on the sum weight of the terpolymer and the polybutadiene. The formulation was fluxed for another three minutes, after which 100 ppm of Pt (based on the sum weight of the terpolymer and the polybutadiene) of the Karstedt's catalyst was added to the mixer, and fluxed for one minute until homogenized.

Figure 11:
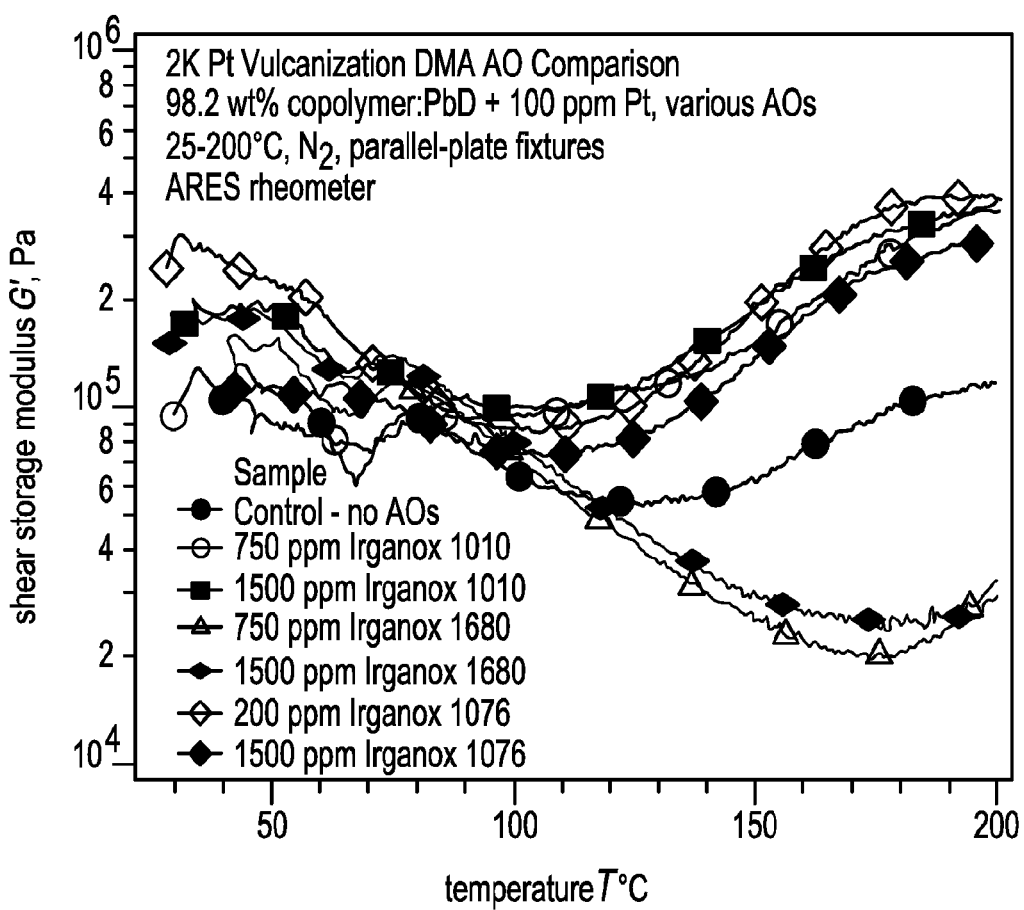
FIG. 11 depicts seven Dynamic Mechanical Analysis (DMA) profiles of a temperature ramp from 25° C. to 200° C., at 2° C./min, for samples with 98 wt % olefin/silane interpolymer, 2 wt % polybutadiene, 100 ppm Pt, and either 200 ppm, 750 ppm or 1500 ppm of IRGANOX 1010, IRGOFOS 1680, or IRGANOX 1076.

Dynamic Mechanical Analysis (DMA) disks (25 mm diameter by 2 mm thick) were compression molded using a Carver Press (20,000 lbs of force, 80° C., 1 minute), and then cooled immediately between water-cooled platens for two minutes. The resulting samples were then tested using a DMA procedure (2° C./min ramp rate, 25° C.-200° C. temperature range) with an ARES rheometer (25 mm disposable aluminum parallel plates, 1.0% strain amplitude, frequency of 1 rad/sec, tested under N2 gas). The data is shown in FIG. 11. This data show that the IRGAFOS 1680, a phosphite based antioxidant, could be used to inhibit the Pt hydrosilylation reaction. Both cases "with IRGAFOS 168 added" show a significantly higher onset temperature of the crosslinking region of the DMA trace (about 180° C.) compared to the uninhibited control case (about 120° C. for this sample). The IRGANOX 1010 and the IRGANOX 1076 formulations show that there may be accelerated crosslinking rates, due to the addition of these hindered phenolic antioxidants. The observed start of crosslinking for each formulation is closer to 100° C., and there is a consistently accelerated rise in shear storage modulus, regardless of the antioxidant loading. This is attributed to reactions between the carbonyl groups or alcohol groups in these IRGANOX antioxidants with silanes in the terpolymer, the reactions of which, are catalyzed by the Pt. The data suggest that the antioxidant loading is less important to Pt inhibition, than is the type of antioxidant, and the temperature at which the antioxidant dissociation occurs.

What is claimed is:

1. A process to form a crosslinked composition, said process comprising thermally treating a composition that comprises the following components:
   a) an olefin/silane interpolymer derived from a compound selected from the following: $H_2C=CH—R1-Si\ (R)(R')—H$, where R1 is an alkylene, and R and R' are each independently an alkyl, and R and R' may be the same or different;
   b) a cure catalyst; and
   c) a multi-vinyl compound.

2. The process of claim 1, wherein the olefin/silane interpolymer of component a is an ethylene/alpha-olefin/silane interpolymer.

3. A process to form a crosslinked composition, said process comprising thermally treating a composition that comprises the following components:
   a) an olefin/silane interpolymer derived from a compound selected from the following:

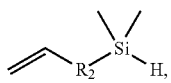

where $R_2$ is an alkylene;
   b) a cure catalyst; and
   c) a multi-vinyl compound.

4. The process of claim 1, wherein the cure catalyst of component b comprises platinum(0)-1,3-divinyl-1,1,3,3-tetramethyldisiloxane.

5. The process of claim 1, wherein the multi-vinyl compound of component c is selected from the following i)-iv):
   i)

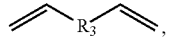

where R3 is selected from an alkylene or an arylene;
   ii) a polydiene comprising at least one of the following structure: $—(CR1R2-CR3=CR4-CR5R6)_n—(CR7R8-CR9\ (CR10-CR11R12))_m—$, where each of R1 through R12 is, independently, hydrogen (H) or an alkyl, and $n≥1$ and $m≥1$;
   iii) $H_3C—CH_2—C\ [R4-O—C(O)—CH=CH_2]_3$, where R4 is an alkylene or an arylene; or
   iv) a cyclic siloxane of the following structure $—[Si(CH=CH_2)(R5)-O]_n—$, where R5 is an alkyl, and n is from 3 to 6.

6. The process of claim 1, wherein the multi-vinyl compound of
   component c is selected from the following: dodecadiene, divinylbenzene, tetravinyltetramethylcyclotetrasiloxane (ViD4), trimethylolpropane triacrylate (TMPTA), or a polybutadiene comprising ≥80 mol % of 1,2 vinyl groups, and having a melt viscosity (45° C.) from 30 to 500 cP.

7. The process of claim 1, wherein the composition further comprises component d: a cure inhibitor.

8. A composition comprising the following components:
   a) an olefin/silane interpolymer derived from a compound selected from the following: $H_2C=CH—R1-Si\ (R)(R')—H$, where R1 is an alkylene, and R and R' are each independently an alkyl, and R and R' may be the same or different;
   b) a cure catalyst; and
   c) a multi-vinyl compound.

9. The composition of claim 8, wherein the olefin/silane interpolymer of component a is an ethylene/alpha-olefin/silane interpolymer.

10. The composition of claim 8, wherein the vinyl compound of component c is selected from the following i)-iv):

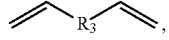

i) where R3 is selected from an alkylene or an arylene;
   ii) a polydiene comprising at least one of the following structure: $—(CR1R2-CR3=CR4-CR5R6)_n—(CR7R8-CR9\ (CR10-CR11R12))_m—$, where each of R1 through R12 is, independently, hydrogen (H) or an alkyl, and $n≥1$ and $m≥1$;
   iii) $H_3C—CH_2—C\ [R4-O—C(O)—CH=CH_2]_3$, where R4 is an alkylene or an arylene; or
   iv) a cyclic siloxane of the following structure $—[Si(CH=CH_2)(R5)-O]_n—$, where R5 is an alkyl, and n is from 3 to 6.

11. The composition of claim 8, wherein the composition further comprises component d: a cure inhibitor.

12. A crosslinked composition formed from the composition of claim 8.

13. An article comprising at least one component formed from the composition of claim 8.

* * * * *